US009110426B2

(12) United States Patent
Kitagawa et al.

(10) Patent No.: US 9,110,426 B2
(45) Date of Patent: Aug. 18, 2015

(54) INFORMATION PROCESSING APPARATUS, DATA GENERATION METHOD, AND DATA STRUCTURE

(75) Inventors: Hiroo Kitagawa, Kanagawa (JP); Hiroaki Suzuki, Chiba (JP); Toshihiro Mochizuki, Tokyo (JP)

(73) Assignee: RICOH COMPANY, LIMITED, Tokyo (JP)

( * ) Notice: Subject to any disclaimer, the term of this patent is extended or adjusted under 35 U.S.C. 154(b) by 233 days.

(21) Appl. No.: 13/233,236

(22) Filed: Sep. 15, 2011

(65) Prior Publication Data

US 2012/0062956 A1 Mar. 15, 2012

(30) Foreign Application Priority Data

Sep. 15, 2010 (JP) ................................ 2010-207356
Sep. 13, 2011 (JP) ................................ 2011-199838

(51) Int. Cl.
*G06K 15/00* (2006.01)
*H04N 1/40* (2006.01)
*G03G 15/00* (2006.01)

(52) U.S. Cl.
CPC .... *G03G 15/6585* (2013.01); *G03G 2215/0081* (2013.01)

(58) Field of Classification Search
USPC ......... 358/1.9, 2.1, 3.06, 3.22, 3.27, 536, 540
See application file for complete search history.

(56) References Cited

U.S. PATENT DOCUMENTS 8,447,204 B2 * 5/2013 Qiao et al. ...................... 399/82
8,699,057 B2 * 4/2014 Ohno .......................... 358/1.15
2010/0134811 A1 * 6/2010 Fukasawa et al. ............ 358/1.9
2010/0196035 A1 * 8/2010 Takemura ...................... 399/67

FOREIGN PATENT DOCUMENTS

JP 3473588 B2 9/2003
JP 2007-34040 2/2007
JP 2011-123473 6/2011

* cited by examiner

*Primary Examiner* — Barbara Reinier
(74) *Attorney, Agent, or Firm* — Oblon, McClelland, Maier & Neustadt, L.L.P.

(57) ABSTRACT

An information processing apparatus includes an input unit that receives specifications of a color, a type of a surface effect that is a visual or a tactile effect, and a region to which the surface effect is applied, with respect to input image data; a generating unit that generates color data and gloss control data based on the specifications, the gloss control data being data which is used for generating clear toner data and in which a gloss control value is specified for identifying the type of the surface effect applied to the recording medium and for identifying a region to which the surface effect is applied in the recording medium; and a sending unit that sends the color data and the gloss control data to a print control apparatus.

8 Claims, 15 Drawing Sheets

| NAME OF GLOSS CONTROL | GLOSSINESS | DEVIATION |
|---|---|---|
| SPECULAR GLOSS (PG) | Gs≧80 | ΔGs≦10 |
| SOLID GLOSS (G) | Gs=Gs (SOLID GLOSS) | ΔGs≦10 |
| HALFTONE-DOT MATT (M) | Gs=Gs (1C WITH 30% OF HALFTONE DOTS) | ΔGs≦10 |
| MATT (PM) | Gs≦10 | ΔGs≦10 |

| TYPE OF SURFACE EFFECT SPECIFIED BY USER | CONCENTRATION VALUE IN GLOSS-CONTROL IMAGE DATA [%] |
|---|---|
| PG | 98% |
| G | 90% |
| M | 16% |
| PM | 6% |

| DRAWING OBJECT | COORDINATE | CONCENTRATION VALUE |
|---|---|---|
| A, B, C | (x1, y1)-(x2, y2) | 98% |
| (TETRAGON) | (x3, y3)-(x4, y4) | 90% |
| ... | ... | ... |

FIG.15

| CONCENTRATION (%) | CONCENTRATION | | | EFFECT | GLOSSER ON/OFF (ON-OFF INFORMATION) | CLEAR TONER PLANE 1 (PRINTER) | CLEAR TONER PLANE 2 (LOW-TEMPERATURE FIXING DEVICE) |
|---|---|---|---|---|---|---|---|
| | REPRESENTATIVE VALUE | VALUE RANGE | | | | | |
| 98% | 250 | 248 | 255 | SPECULAR GLOSS TYPE A | ON | INVERSE MASK A | NO DATA |
| 96% | 245 | 243 | 247 | SPECULAR GLOSS TYPE B | ON | INVERSE MASK B | NO DATA |
| 94% | 240 | 238 | 242 | SPECULAR GLOSS TYPE C | ON | INVERSE MASK C | NO DATA |
| 92% | 235 | 233 | 237 | RESERVED | | | |
| 90% | 230 | 228 | 232 | SOLID GLOSS TYPE 1 | OFF | INVERSE MASK 1 | NO DATA |
| 88% | 224 | 222 | 227 | SOLID GLOSS TYPE 2 | OFF | INVERSE MASK 2 | NO DATA |
| 86% | 219 | 217 | 221 | SOLID GLOSS TYPE 3 | OFF | INVERSE MASK 3 | NO DATA |
| 84% | 214 | 212 | 216 | SOLID GLOSS TYPE 4 | OFF | INVERSE MASK 4 | NO DATA |
| 82% | 209 | 207 | 211 | RESERVED | | | |
| 46% | 117 | 115 | 119 | RESERVED | | | |
| 44% | 112 | 110 | 114 | WATERMARK CHARACTER 3 (XXX) | OFF | NO DATA | TILE STRING 3 |
| 42% | 107 | 105 | 109 | WATERMARK CHARACTER 2 (COPY PROHIBITED) | | NO DATA | TILE STRING 2 |
| 40% | 102 | 100 | 104 | WATERMARK CHARACTER 1 (SAMPLE) | | NO DATA | TILE STRING 1 |
| 38% | 97 | 95 | 99 | RESERVED | | | |
| 36% | 92 | 90 | 94 | RESERVED | | | |
| 34% | 87 | 85 | 89 | BACKGROUND PATTERN 3 (XXX) | | NO DATA | TILE BACKGROUND PATTERN 3 |
| 32% | 82 | 80 | 84 | BACKGROUND PATTERN 2 (LATTICE) | | NO DATA | TILE BACKGROUND PATTERN 2 |
| 30% | 76 | 74 | 79 | BACKGROUND PATTERN 1 (WAVE) | | NO DATA | TILE BACKGROUND PATTERN 1 |
| 28% | 71 | 69 | 73 | RESERVED | | | |
| 26% | 66 | 64 | 68 | RESERVED | | | |
| 24% | 61 | 59 | 63 | TEXTURE PATTERN TYPE 3 (ROUGH) | | NO DATA | TILE MESH PATTERN 3 |
| 22% | 56 | 54 | 58 | TEXTURE PATTERN TYPE 2 (MODERATE) | | NO DATA | TILE MESH PATTERN 2 |
| 20% | 51 | 49 | 53 | TEXTURE PATTERN TYPE 1 (FINE) | | NO DATA | TILE MESH PATTERN 1 |
| 18% | 46 | 44 | 48 | RESERVED | | | |
| 16% | 41 | 39 | 43 | HALFTONE-DOT MATT TYPE 4 | OFF | HALFTONE 4 | NO DATA |
| 14% | 36 | 34 | 38 | HALFTONE-DOT MATT TYPE 3 | OFF | HALFTONE 3 | NO DATA |
| 12% | 31 | 29 | 33 | HALFTONE-DOT MATT TYPE 2 | OFF | HALFTONE 2 | NO DATA |
| 10% | 25 | 23 | 28 | HALFTONE-DOT MATT TYPE 1 | OFF | HALFTONE 1 | NO DATA |
| 8% | 20 | 18 | 22 | RESERVED | | | |
| 6% | 15 | 13 | 17 | MATT TYPE C | ON&OFF | NO DATA | SOLID |
| 4% | 10 | 8 | 12 | MATT TYPE B | ON&OFF | NO DATA | SOLID |
| 2% | 5 | 1 | 7 | MATT TYPE A | ON&OFF | NO DATA | SOLID |
| 0% | 0 | 0 | 0 | NOTHING | OFF | NO DATA | NO DATA |

INFORMATION PROCESSING APPARATUS, DATA GENERATION METHOD, AND DATA STRUCTURE

CROSS-REFERENCE TO RELATED APPLICATIONS

The present application claims priority to and incorporates by reference the entire contents of Japanese Patent Application No. 2010-207356 filed in Japan on Sep. 15, 2010 and Japanese Patent Application No. 2011-199838 filed in Japan on Sep. 13, 2011.

BACKGROUND OF THE INVENTION

1. Field of the Invention

The present invention relates to an information processing apparatus, a data generation method, and a data structure.

2. Description of the Related Art

Conventional image forming apparatuses are sometimes equipped with a clear toner as a colorless toner that does not contain a color material, in addition to four CMYK color toners. A toner image formed with such a clear toner is fixed to a recording medium, such as a transfer sheet, on which an image is already formed with the CMYK toners, so that a visual effect or a tactile effect (a surface effect) can be realized on the surface of the recording medium. What surface effect is to be realized depends on what toner image is formed with the clear toner and how the toner image is fixed to the recording medium. There are surface effects that simply apply gloss, while there are surface effects that suppress gloss. In addition, there is a need to apply a surface effect not only to the whole surface but also to only a part of the surface or to apply a surface effect in order to add a texture or a watermark by using the clear toner. There is also a need to give surface protection. Some surface effects are realized by performing post processing by a special post processing device, such as a glosser or a low-temperature fixing device, besides fixing control. In recent years, as disclosed in Japanese Patent No. 3473588, a technology has been developed in which a clear toner is attached to only a desired portion in a part of the surface so that gloss can be applied to only the desired portion.

Furthermore, as disclosed in Japanese Patent Application Laid-open No. 2007-034040, glossiness is influenced by the degree of surface roughness of an image formed on a recording medium. That is, the glossiness is influenced by concavity and convexity that are formed on the surface with the CMYK toners. Therefore, the glossiness is not increased simply in proportion to the concentration of the clear toner.

More specifically, it is needed to control smoothness of the surface of an image in order to apply gloss. To address this matter, it is needed to generate clear-toner image data, which is image data used for forming a toner image with a clear toner, based on a CMYK concentration value of each pixel to which the clear toner is to be attached, presence or absence of a post processing device connected to an image forming apparatus, and a type of the post processing apparatus. Therefore, it is needed to precisely adjust the contents of the clear-toner image data, the number of the pieces of the clear-toner image data, control of the printer, and control of the post processing device. However, it has been difficult for a user to generate image data and make print settings for the control by taking all of the above matters into consideration.

Furthermore, according to the conventional technology, while it is possible to apply one type of a surface effect, such as specular gloss, to the whole surface of one page of a recording medium, it is difficult to apply a plurality of types of gloss to one page of a recording medium.

SUMMARY OF THE INVENTION

It is an object of the present invention to at least partially solve the problems in the conventional technology.

According to an aspect of the present invention, there is provide an information processing apparatus connected to a print control apparatus that controls a printing device. The printing device is equipped with at least one color toner that is colored and at least one clear toner that is colorless, and forms an image on a recording medium based on at least one piece of color data used for attaching the color toner and at least one piece of clear toner data used for attaching the clear toner. The information processing apparatus includes an input unit that receives specifications of a color, a type of a surface effect that is a visual or a tactile effect, and a region to which the surface effect is applied, with respect to input image data; a generating unit that generates the color data and gloss control data based on the specifications, the gloss control data being data which is used for generating the clear toner data and in which a gloss control value is specified for identifying the type of the surface effect applied to the recording medium and for identifying a region to which the surface effect is applied in the recording medium; and a sending unit that sends the color data and the gloss control data to the print control apparatus.

According to another aspect of the present invention, there is provided a data generation method implemented by an information processing apparatus connected to a print control apparatus that controls a printing device. The printing device is equipped with at least one color toner that is colored and at least one clear toner that is colorless, and forms an image on a recording medium based on at least one piece of color data used for attaching the color toner and at least one piece of clear toner data used for attaching the clear toner. The data generation method includes receiving specifications of a color, a type of a surface effect that is a visual or a tactile effect, and a region to which the surface effect is applied, with respect to input image data; generating the color data and gloss control data based on the specifications, the gloss control data being data which is used for generating the clear toner data and in which a gloss control value is specified for identifying the type of the surface effect applied to the recording medium and for identifying a region to which the surface effect is applied in the recording medium; and sending the color data and the gloss control data to the print control apparatus.

According to still another aspect of the present invention, there is provided a data structure including a gloss control data in which a gloss control value is specified for identifying a type of a surface effect that is a visual or a tactile effect applied to a recording medium on which an image is formed and for identifying a region to which the surface effect is applied in the recording medium.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 15 is a diagram illustrating an exemplary data structure of a surface-effect selection table;

DETAILED DESCRIPTION OF THE PREFERRED EMBODIMENTS

Figure 1:
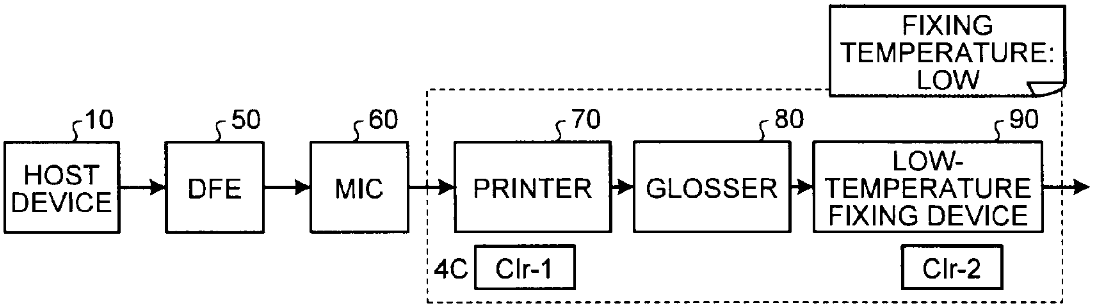
FIG. 1 is a diagram of a configuration example of an image forming system according to a first embodiment.

Exemplary embodiments of an information processing apparatus, a data generation method, and a according to the present invention will be explained in detail below with reference to the accompanying drawings.

First Embodiment

A configuration of an image forming system according to a first embodiment will be explained below with reference to FIG. 1. In the embodiment, the image forming system includes a printer control device (a Digital Front End (DFE)) 50 (hereinafter, described as "a DFE 50"), an interface controller (Mechanism I/F controller (MIC)) 60 (hereinafter, described as "a MIC 60"), a printer 70, a glosser 80 as a post processing device, and a low-temperature fixing device 90 as a post processing device, which are connected to one another. The DFE 50 communicates with the printer 70 via the MIC 60 and controls image formation performed by the printer 70. The DFE 50 is connected to a host device 10, such as a personal computer (PC); receives image data from the host device 10; generates image data, which is to be used by the printer 70 to form toner images corresponding to CMYK toners and a clear toner, by using the received image data; and sends the image data to the printer 70 via the MIC 60. The printer 70 is equipped with at least each of the CMYK toners and the clear toner. The printer 70 includes image forming units for the respective toners, each of which includes a photosensitive element, a charging unit, a developing unit, and a photosensitive-element cleaner; an exposing unit; and a fixing unit.

The clear toner is a transparent (colorless) toner that does not contain a color material. The transparent (colorless) indicates that, for example, transmittance is 70% or greater.

The printer 70 forms toner images of the respective toners on the photosensitive elements by applying light beams from the exposing unit in accordance with the image data sent from the DFE 50 via the MIC 60; transfers the toner images to a transfer sheet that is a recording medium; and fixes the toner images to the transfer sheet by applying heat and pressure at a temperature in a predetermined range (a normal temperature) by using the fixing unit. As a result, an image is formed on the transfer sheet. The configuration of the printer 70 as described above is widely known; therefore, detailed explanation thereof will be omitted.

The glosser 80 is controlled to be on or off by on-off information specified by the DFE 50. When turned on, the glosser 80 applies pressure at high temperature and high pressure to the image that the printer 70 has formed on the transfer sheet. Thereafter, the transfer sheet having the image formed thereon is cooled and then removed from the main body of the glosser 80. Consequently, the total amount of toner attached to each pixel, on which more than a predetermined amount of toner has been attached, can be uniformly compressed over the whole image generated on the transfer sheet. The low-temperature fixing device 90 is equipped with a clear toner image forming unit including a photosensitive element, a charging unit, a developing unit, and a photosensitive-element cleaner; an exposing unit; and a fixing unit for fixing a clear toner, and receives image data of a clear toner plane generated by the DFE 50 for use by the low-temperature fixing device 90, which will be described below. When the DFE 50 generates the image data of the clear toner plane (hereinafter, described as "clear-toner image data") to be used by the low-temperature fixing device 90, the low-temperature fixing device 90 generates a toner image with the clear toner by using the image data, superimposes the toner image on the transfer sheet to which the pressure has been applied by the glosser 80, and fixes the toner image by applying lower heat or pressure than normal by using the fixing unit.

Image data (original data) input from the host device 10 will be explained below. The host device 10 generates image data by a pre-installed image processing application (an image processing unit 120, a plane-data generating unit 122, a print-data generating unit 123, or the like, which will be described below) and sends the image data to the DFE 50. The image processing application as above can handle image data of a special color plane (hereinafter, described as "special-color image data") with respect to image data of each color plane, such as an RGB plane or a CMYK plane, in which a value of concentration (described as a "concentration value") of each color is defined for each pixel. The special-color image data is image data used for adding a special toner or ink, such as white, gold, or silver, in addition to basic colors, such as CMYK or RGB. The special-color image data is data used by a printer equipped with a special toner or ink. The special-color image data may be used for adding R to CMYK basic colors or adding Y to RGB basic colors in order to improve color reproducibility. In general, the clear toner has been handled as one of the special colors.

In the embodiment, the clear toner as the special color is used for forming a certain surface effect, which is a visual or tactile effect to be added to a transfer sheet, and to form a transparent image, such as a watermark or a texture, other than the above surface effect.

Therefore, the image processing application installed in the host device 10 generates image data of a color plane (hereinafter, described as "color image data") and also generates image data of a gloss control plane (hereinafter, described as "gloss-control image data") and/or clear-toner image data as the special-color image data according to specifications made by a user, with respect to the input image data.

Figure 2:
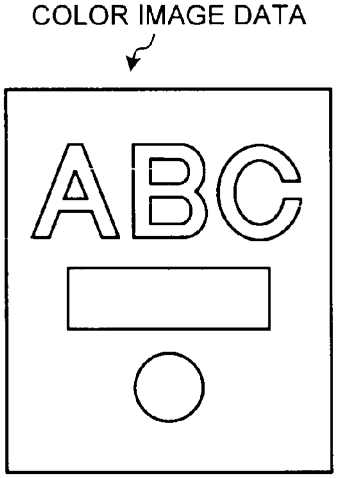
FIG. 2 is a diagram illustrating an example of color image data.

The color image data is image data in which a concentration value of a color, such as RGB or CMYK, is defined for each pixel. In the color image data, one pixel is represented by 8 bits according to a color specified by a user. FIG. 2 is a diagram illustrating an example of the color image data. In FIG. 2, a concentration value corresponding to a color specified by a user via the image processing application is assigned to each of drawing objects, such as "A", "B", and "C".

The gloss-control image data is image data in which a region to which a surface effect is to be applied and a type of the surface effect are specified in order to control adhesion of the clear toner in accordance with the surface effect that is a visual or a tactile effect to be applied to a transfer sheet.

In the gloss-control image data, each pixel is represented by a concentration value in a range from "0" to "255" using 8 bits, similarly to RGB color data or CMYK color data. A type of the surface effect is associated with the concentration value (the concentration value may be represented by 16 bits, 32 bits, or 0 to 100%). The same value is set to a range to which the same surface effect is to be applied, regardless of the concentration of the clear toner to be actually attached. Therefore, if needed, it is possible to easily identify the region from the image data even without data that indicates the region. That is, the gloss-control image data represents the type of the surface effect and the region to which the surface effect is to be applied (it may be possible to additionally provide data indicating the region).

The host device 10 generates the gloss-control image data in a vector format by setting a type of the surface effect, which is specified for each drawing object by a user via the image processing application, as a concentration value that is a gloss control value for each drawing object.

Each pixel contained in the gloss-control image data corresponds to each pixel of the color image data. In each image data, a concentration value of each pixel becomes a pixel value. The color image data and the gloss-control image data are constructed in page units.

As the types of the surface effects, there are mainly the following types: presence or absence of gloss; surface protection; a watermark with embedded information; and a texture. As the surface effect related to the presence or absence of the gloss, there are mainly the following four types as illustrated by example in FIG. 3: specular gloss (Premium Gloss (PG)); solid gloss (Gloss (G)); halftone-dot matt (Matt (M)); and matt (Premium Matt (PM)) in descending order of the level of gloss (glossiness). In the following, the specular gloss may be described as "PG", the solid gloss may be described as "G", the halftone-dot matt may be described as "M", and the matt may be described as "PM".

The specular gloss and the solid gloss are used for giving high level of gloss while the halftone-dot matt and the matt are used for reducing gloss. In particular, the matt is used for realizing lower glossiness than the glossiness of a normal transfer sheet. In the figure, the specular gloss indicates the glossiness Gs of 80 or greater, the solid gloss indicates the solid glossiness of a primary color or a secondary color, the halftone-dot matt indicates the glossiness of a primary color with 30% of halftone dots, and the matt indicates the glossiness of 10 or smaller. The deviation of the glossiness is represented by ΔGs and set to 10 or smaller. For the above types of the surface effects, high concentration values are associated with the surface effect that gives high level of gloss, and low concentration values are associated with the surface effect that reduces gloss. Intermediate concentration values are associated with the other surface effects, such as the watermark and the texture. As the watermark, a character or a background pattern may be used. The texture represents a character or a pattern and gives a tactile effect in addition to a visual effect. For example, a stained glass pattern can be realized by a clear toner. The surface protection is realized by using the specular gloss or the solid gloss as a substitute for the surface protection. A region to which a surface effect is to be applied in an image represented by image data being a processing object and a type of the surface effect to be applied are specified by a user via the image processing application. The host device 10 that executes the image processing application generates the gloss-control image data by setting a concentration value corresponding to the surface effect specified by the user to each drawing object contained in the region specified by the user. A correspondence relation between the concentration value and the type of the surface effect will be described below.

Figures 3, 4:
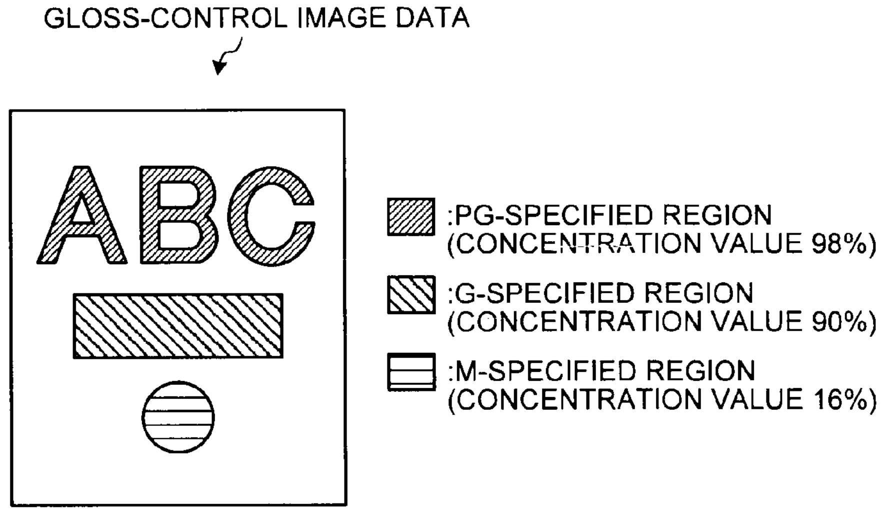
FIG. 3 is a diagram illustrating exemplary types of surface effects related to presence or absence of gloss.
FIG. 4 is a diagram illustrating an image of gloss-control image data.

FIG. 4 is an explanatory diagram illustrating an example of the gloss-control image data. In the example of the gloss-control image data illustrated in FIG. 4, a case is illustrated in which the surface effect "PG (specular gloss)" is applied to a drawing object "ABC", the surface effect "G (solid gloss)" is applied to a drawing object "a rectangle", and the surface effect "M (halftone-dot matt)" is applied to a drawing object "a circle". The concentration value set to each surface effect is determined in accordance with the type of the surface effect by a concentration-value selection table (see FIG. 9) to be described below.

Figure 5:
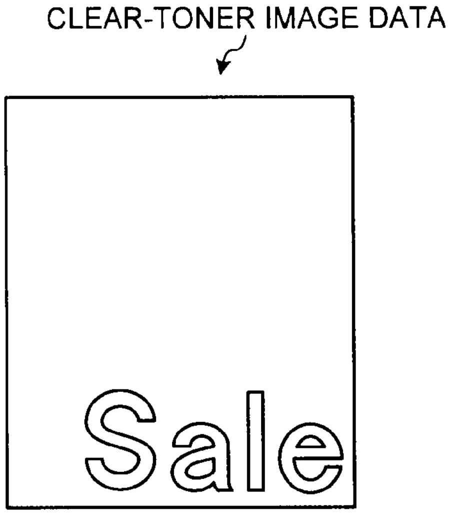
FIG. 5 is a diagram illustrating an example of clear-toner image data.

The clear-toner image data is image data in which a transparent image, such as a watermark or a texture, other than the surface effects described above is specified. FIG. 5 is an explanatory diagram illustrating an example of the clear-toner image data. In the example illustrated in FIG. 5, a watermark "Sale" is specified by a user.

As described above, the gloss-control image data and the clear-toner image data, which are the special-color image data, are generated by the image processing application of the host device 10 in a plane separated from that of the color image data. A Portable Document Format (PDF) is used as the image data format of each of the color image data, the gloss-control image data, and the clear-toner image data, and the pieces of the PDF image data are integrated into original data. The data format of the image data of each plane is not limited to PDF, and any formats may be used.

Figure 6:
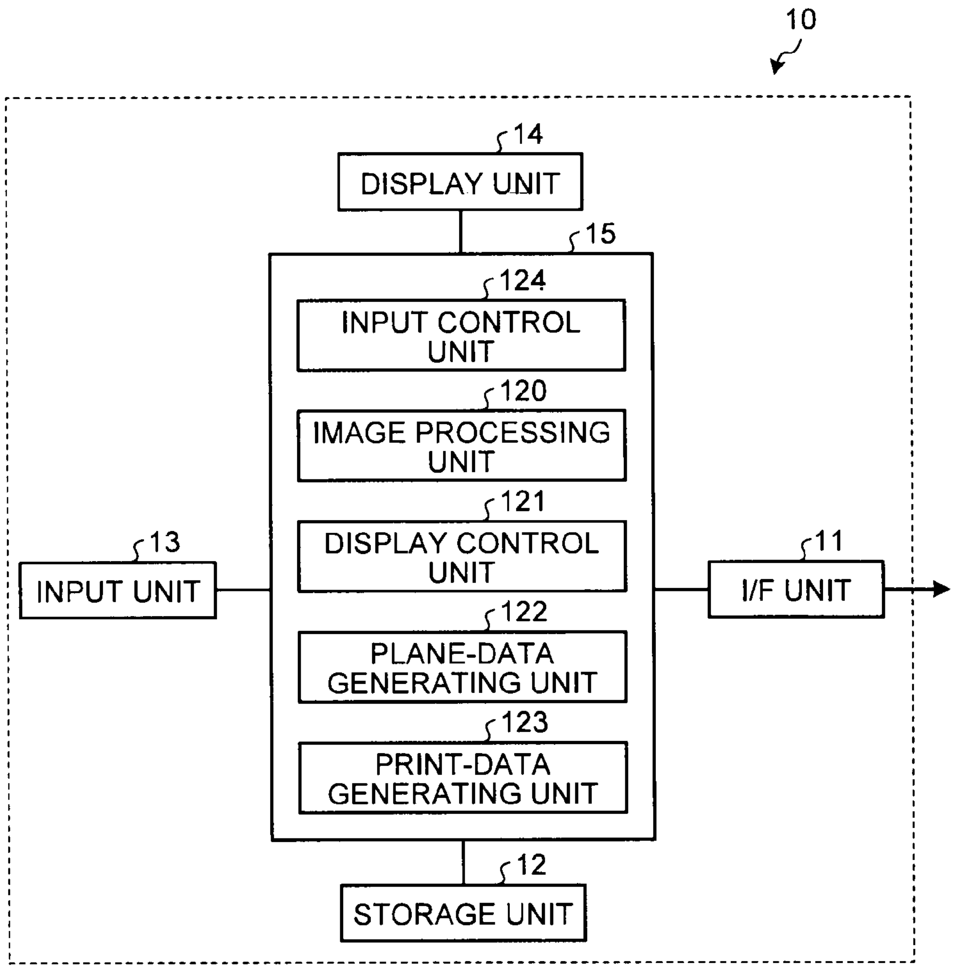
FIG. 6 is a block diagram of a schematic configuration example of a host device.

The host device 10 that generates image data of each plane as described above will be explained below. FIG. 6 is a block diagram of a schematic configuration example of the host device 10. As illustrated in FIG. 6, the host device 10 includes an I/F unit 11, a storage unit 12, an input unit 13, a display unit 14, and a control unit 15. The I/F unit 11 is an interface device for performing communication with a DFE 50. The storage unit 12 is a recording medium, such as a hard disk drive (HDD) or a memory, for storing various types of data. The input unit 13 is an input device used for inputting various types of operations by a user and includes, for example, a keyboard or a mouse. The display unit 14 is a display device for displaying various screens and includes, for example, a liquid crystal panel.

The control unit 15 is a computer that controls the entire host device 10 and includes a CPU, a ROM, a RAM, and the like. As illustrated in FIG. 6, the control unit 15 mainly includes an input control unit 124, the image processing unit 120, a display control unit 121, the plane-data generating unit 122, and the print-data generating unit 123. The input control unit 124 and the display control unit 121 are realized by causing the CPU of the control unit 15 to read a program of an operating system stored in the ROM or the like, load the program to the RAM, and execute the loaded program. The image processing unit 120, the plane-data generating unit 122, and the print-data generating unit 123 are realized by causing the CPU of the control unit 15 to read a program of the image processing application stored in the ROM or the like, load the program to the RAM, and executes the loaded program. The plane-data generating unit 122 is provided as, for example, a plug-in function installed in the image processing application. It is possible to realize at least a part of the above units by an individual circuit (hardware).

The input control unit 124 receives various types of input from the input unit 13 and controls the input. For example, by operating the input unit 13, a user can input image specification information for specifying an image to which a surface effect is to be applied, i.e., color image data (hereinafter, appropriately described as a "target image") from among various images (for example, a photograph, a character, a figure, or a composite image containing a photograph, a character and a figure) stored in the storage unit 12. A method of inputting the image specification information is not limited to the above, and any arbitrary methods may be used.

The display control unit 121 controls display of various types of information on the display unit 14. According to the embodiment, when the input control unit 124 receives the image specification information, the display control unit 121 reads an image specified by the image specification information from the storage unit 12 and causes the display unit 14 to display the read image on a screen.

A user can input specification information for specifying a region to which a surface effect is applied and a type of the surface effect by operating the input unit 13 while checking the target image displayed on the display unit 14. A method of inputting the specification information is not limited to the above, and any arbitrary methods may be used.

Figure 7:
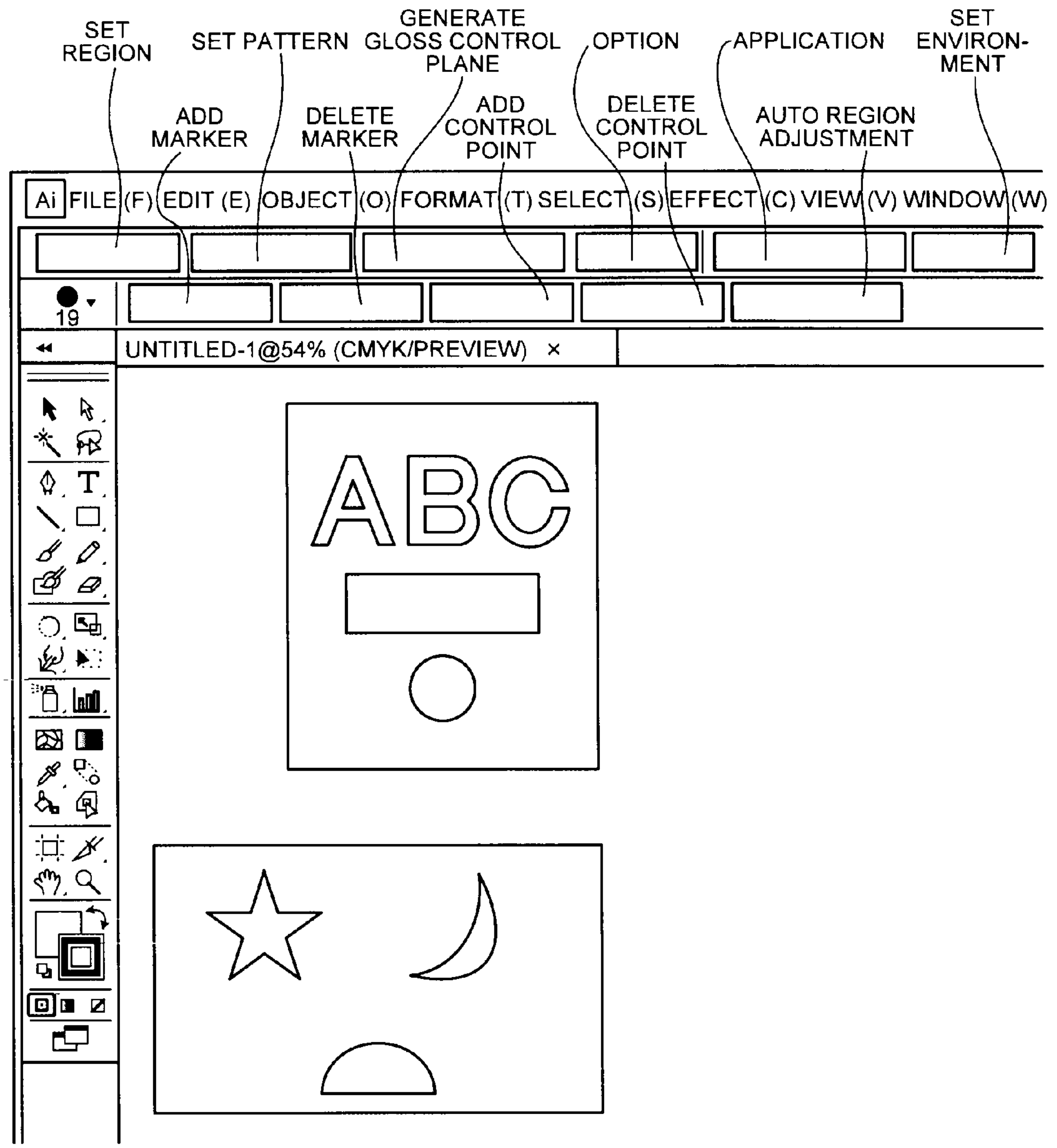
FIG. 7 is a diagram illustrating an example of a screen displayed by an image processing application.
Figure 8:
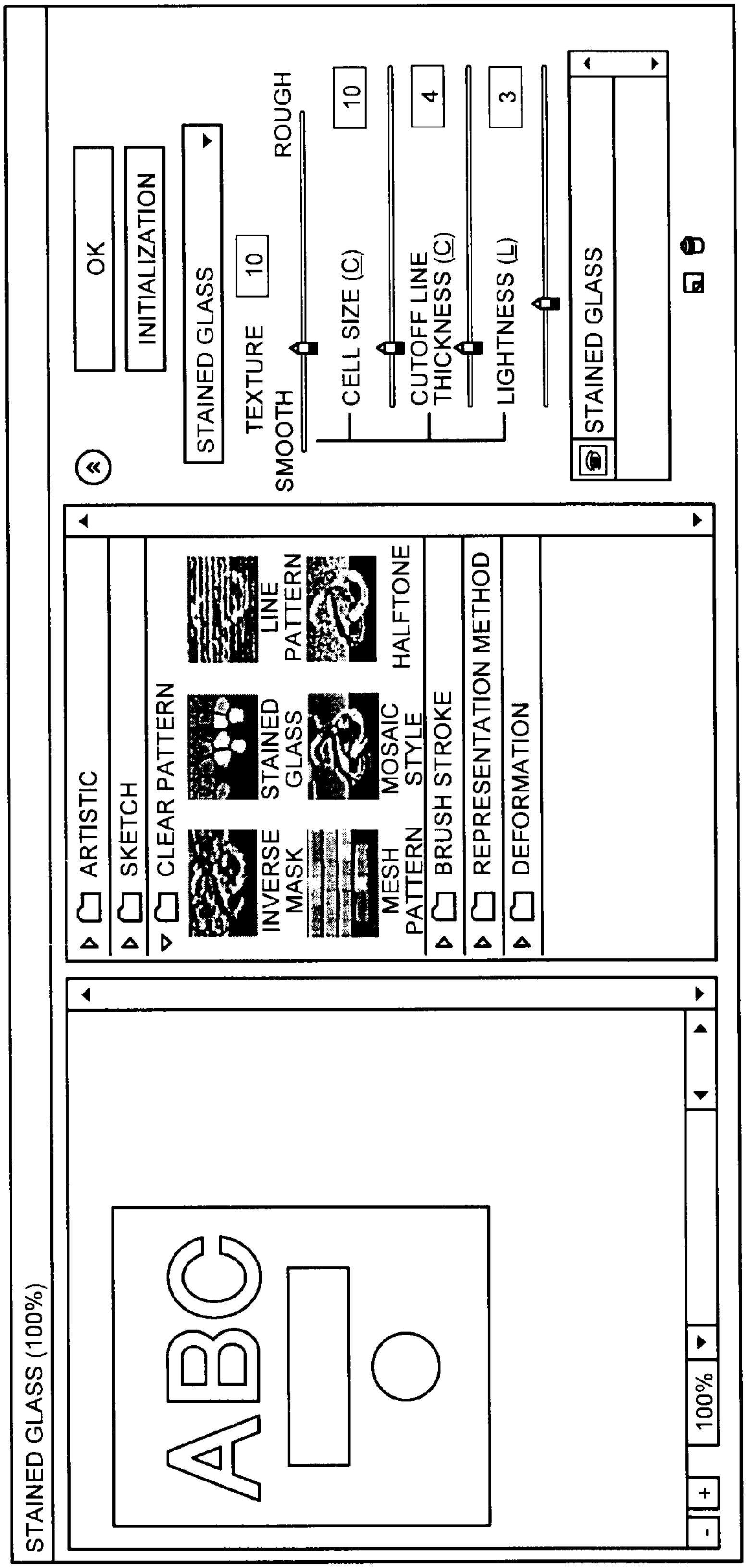
FIG. 8 is a diagram illustrating an example of a screen displayed by the image processing application.

More specifically, the display control unit 121 displays a screen as illustrated in FIG. 7 for example on the display unit 14. FIG. 7 illustrates an example of a screen that is displayed when plug-in is incorporated in Adobe Illustrator (Registered) marketed by Adobe Systems Inc. In the screen illustrated in FIG. 7, an image represented by target image data being a processing object (i.e., color image data) is displayed. When a user inputs operation of specifying a region to which the surface effect is applied by pressing a marker addition button via the input unit 13, the region to which the surface effect is applied is specified. The user inputs the above operation for each of the regions to which a surface effect is applied. The display control unit 121 of the host device 10 displays a screen as illustrated in FIG. 8 for example on the display unit 14 for each specified region. In the screen illustrated in FIG. 8, an image of the region is displayed in each region that is specified as a target to which the surface effect is to be applied. By inputting the operation of specifying the type of the surface effect to be applied to the image via the input unit 13, it is possible to specify the type of the surface effect to be applied to the region. As the type of the surface effect, the specular gloss and the solid gloss in FIG. 3 are described as "inverse mask" in FIG. 8 while the effects other than the specular gloss and the solid gloss in FIG. 3 are described as a stained glass, a line pattern, a mesh pattern, a mosaic style, a halftone-dot matt, and a halftone. It is also indicated that each surface effect can be specified.

Referring back to FIG. 6, the image processing unit 120 performs various types of image processing on the target image on the basis of an instruction received from the user via the input unit 13.

The plane-data generating unit 122 generates color image data, gloss-control image data, and clear-toner image data. That is, when the input control unit 124 receives color specification on a drawing object in the target image from a user, the plane-data generating unit 122 generates color image data in accordance with the color specification.

When the input control unit 124 receives a transparent image, such as a watermark or a texture, other than the surface effect and receives specification of a region to which the transparent image is to be applied, the plane-data generating unit 122 generates clear-toner image data that identifies the transparent image and a region to which the transparent image is applied in a transfer sheet, in accordance with the specification made by the user.

When the input control unit 124 receives specification information (a region to which the surface effect is applied and a type of the surface effect), the plane-data generating unit 122 generates gloss-control image data for identifying the region to which the surface effect is to be applied in the transfer sheet and for identifying the type of the surface effect, on the basis of the specification information. At this time, the plane-data generating unit 122 generates the gloss-control image data, in which a region to be applied with the surface effect indicated by the gloss control value is specified for each drawing object in the image data of the target image.

Figures 9, 10:
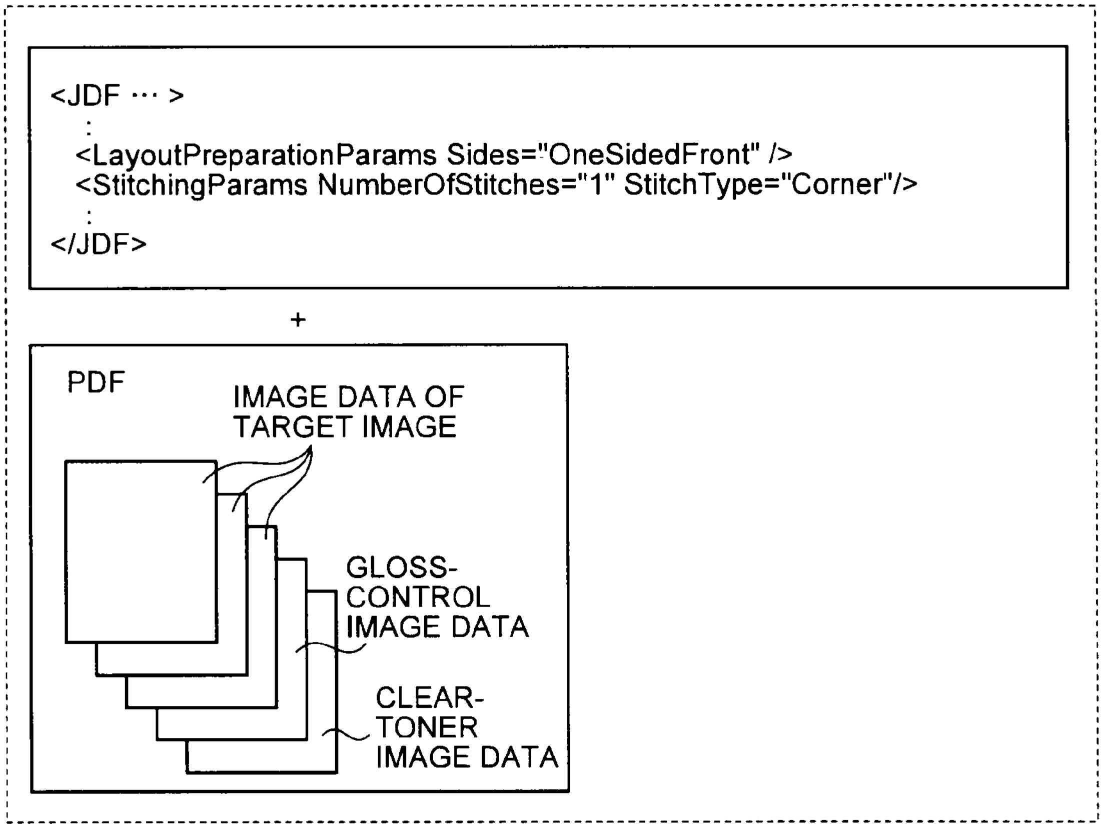
FIG. 9 is a diagram illustrating an example of a concentration-value selection table.
FIG. 10 is a diagram schematically illustrating a configuration example of print data.

The storage unit 12 stores therein the concentration-value selection table that contains a type of a surface effect specified by a user and a concentration value corresponding to the type of the surface effect in the gloss-control image data. FIG. 9 is a diagram illustrating an example of the concentration-value selection table. In the example of FIG. 9, "98%" is set to a concentration value corresponding to a region in which "PG" (specular gloss) is specified in the gloss-control image data by the user; "90% is set to a concentration value corresponding to a region in which "G" (solid gloss) is specified in the gloss-control image data"; "16%" is set to a concentration value corresponding to a region in which "M" (halftone-dot matt) is specified in the gloss-control image data; and "6%" is set to a concentration value corresponding to a region in which "PM" (matt) is specified in the gloss-control image data.

The concentration-value selection table is a part of data contained in a surface-effect selection table (to be described below) stored in the DFE 50. The control unit 15 acquires the surface-effect selection table at a predetermined timing, generates the concentration-value selection table from the acquired surface-effect selection table, and stores the concentration-value selection table in the storage unit 12. It is possible to store the surface-effect selection table in a storage server (cloud) on the network, such as the Internet, so that the control unit 15 can acquire the surface-effect selection table from the server and generate the concentration-value selection tale from the acquired surface-effect selection table. However, data of the surface-effect selection table stored in the DFE 50 needs to be the same as data of the surface-effect selection table stored in the storage unit 12.

Referring back to FIG. 6, the plane-data generating unit 122 sets a concentration value (a gloss control value) to a drawing object to which a predetermined surface effect is specified by a user, in accordance with the type of the specified surface effect by referring to the concentration-value selection table illustrated in FIG. 9. For example, it is assumed that the user specifies "PG" for a region represented by "ABC", specifies "G" for the rectangular region, and specifies "M" for the circular region in the target image being the color image data illustrated in FIG. 2. In this case, the plane-data generating unit 122 sets "98%" to a concentration value of the drawing object ("ABC") for which the "PG" is specified by the user, sets "90%" to a concentration value of the drawing object ("the rectangle") for which the "G" is specified, and sets "16%" to a concentration value of the drawing object ("the circle") for which the "M" is specified, to thereby generate the gloss-control image data. The gloss-control image data generated by the plane-data generating unit 122 is data in a vector format, which is represented as aggregation of coordinates of points, parameters in equations on lines or planes connecting the points, and drawing objects indicating painted portions or special effects. FIG. 4 is a diagram illustrating an image of the gloss-control image data. The plane-data generating unit 122 generates original data by combining the gloss-control image data, the image data of the target image (the color image data), and the clear-toner image data, and sends the original data to the print-data generating unit 123.

The print-data generating unit 123 generates print data based on the original data. The print data contains the image data of the target image (the color image data), the gloss-control image data, the clear-toner image data, and a job command for specifying, for example, printer setting, aggregation setting, or duplex setting for the printer. FIG. 10 is a diagram schematically illustrating a configuration example of the print data. In the example of FIG. 10, Job Definition Format (JDF) is used as the job command; however, the present invention is not limited thereto. The JDF illustrated in FIG. 10 is a command for specifying "one-side printing and stapling" as the aggregation setting. The print data may be converted to page description language (PDL), such as PostScript, or may be maintained in the PDF format if the DFE 50 can handle the PDF format.

Figure 11:
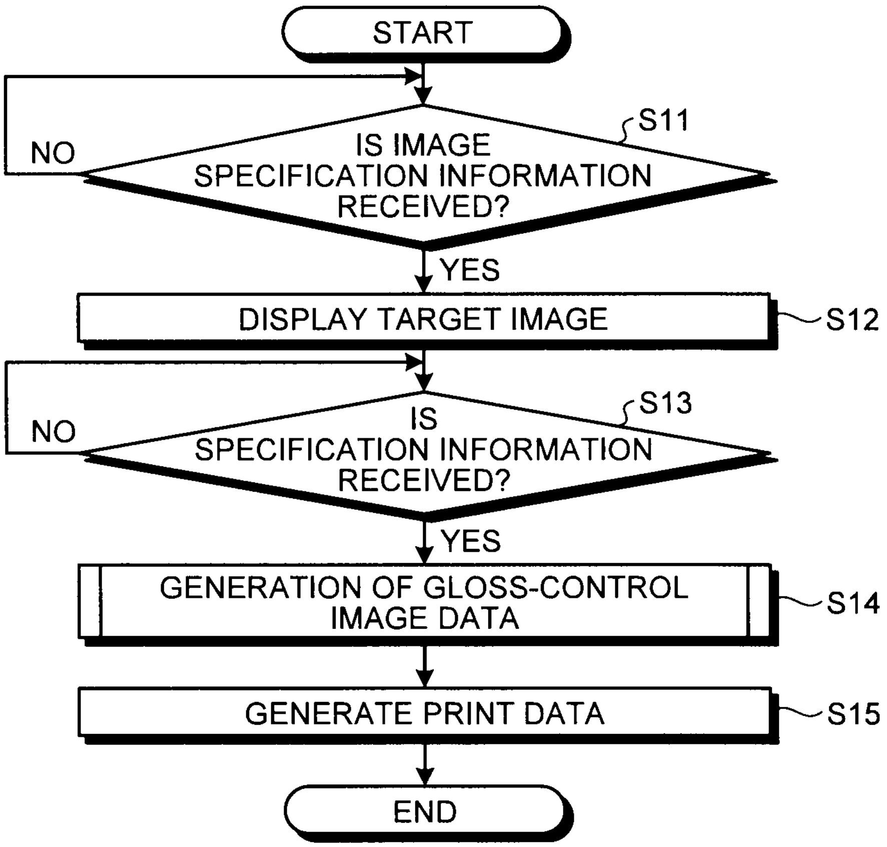
FIG. 11 is a flowchart of a procedure of a print-data generation process performed by the host device according to the first embodiment.

A print-data generation process performed by the host device 10 configured as above will be explained below. FIG. 11 is a flowchart of a procedure of the print-data generation process performed by the host device 10 according to the first embodiment. In the following process example, a case will be explained in which a transparent image is not specified and the clear-toner image data is not generated.

When the input control unit 124 receives input of image specification information (YES at Step S11), the display control unit 121 causes the display unit 14 to display an image specified by the received image specification information (Step S12). When the input control unit 124 receives input of surface-effect specification information (YES at Step S13), the plane-data generating unit 122 generates gloss-control image data on the basis of the received specification information (Step S14).

Figure 12:
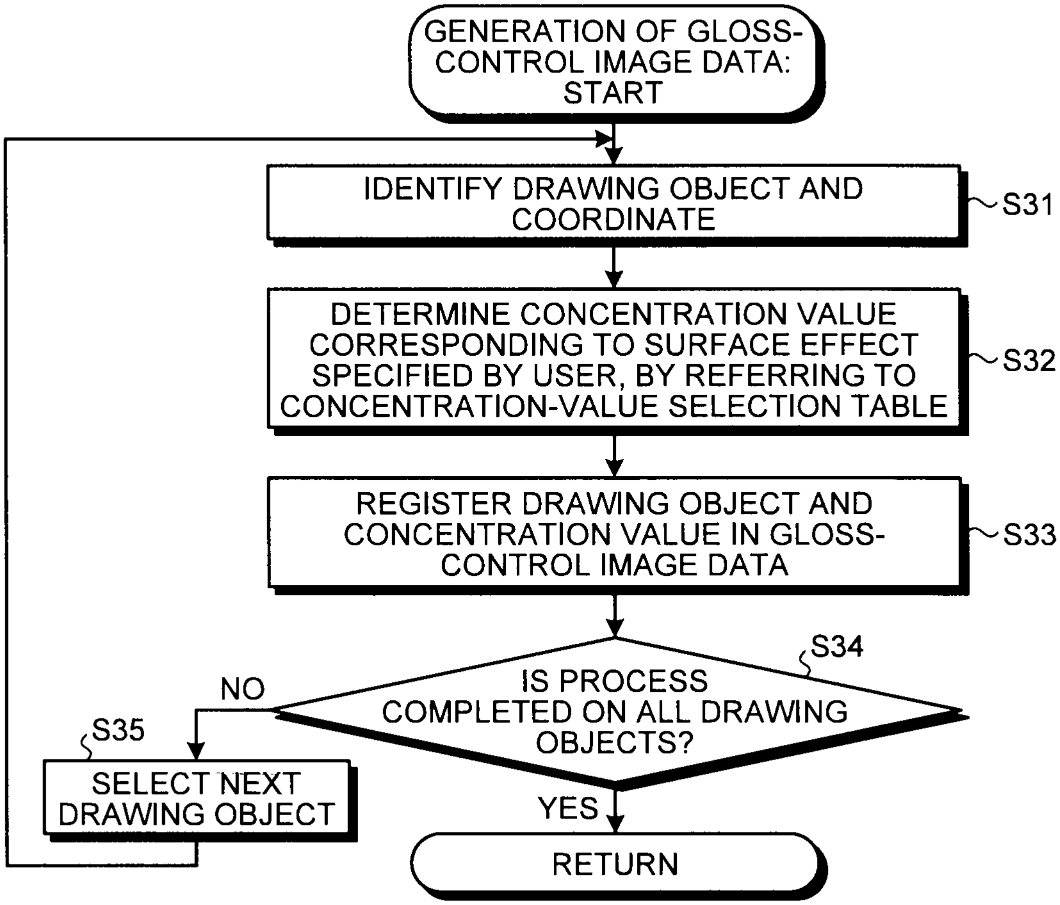
FIG. 12 is a flowchart of a procedure of a process for generating gloss-control image data.

A process for generating the gloss-control image data at Step S14 will be explained in detail below. FIG. 12 is a flowchart of a procedure of the process for generating the gloss-control image data.

The plane-data generating unit 122 identifies a drawing object to which a surface effect is applied and a coordinate of the drawing object in the target image on the basis of the specification information (Step S31). The drawing object and the coordinate are identified by using a drawing command, which is provided by an operating system or the like when the image processing unit 120 draws the drawing object in the target image, and a coordinate value set by the drawing command.

The plane-data generating unit 122 determines a concentration value as a gloss control value corresponding to the surface effect applied by the user by the specification information, by referring to the concentration-value selection table stored in the storage-unit 12 (Step S32).

The plane-data generating unit 122 registers, in gloss-control image data (which is initially blank data), the drawing object and the concentration value that is determined in accordance with the surface effect, in an associated manner (Step S33).

The plane-data generating unit 122 determines whether the process from Step S31 to Step S33 is completed on all of the drawing objects contained in the target image (Step S34). When the process is not completed on any of the drawing objects (NO at Step S34), the plane-data generating unit 122 selects a next drawing object that is not processed in the target image (Step S35) and repeats the process from Step S31 to Step S33.

Figures 13, 14:
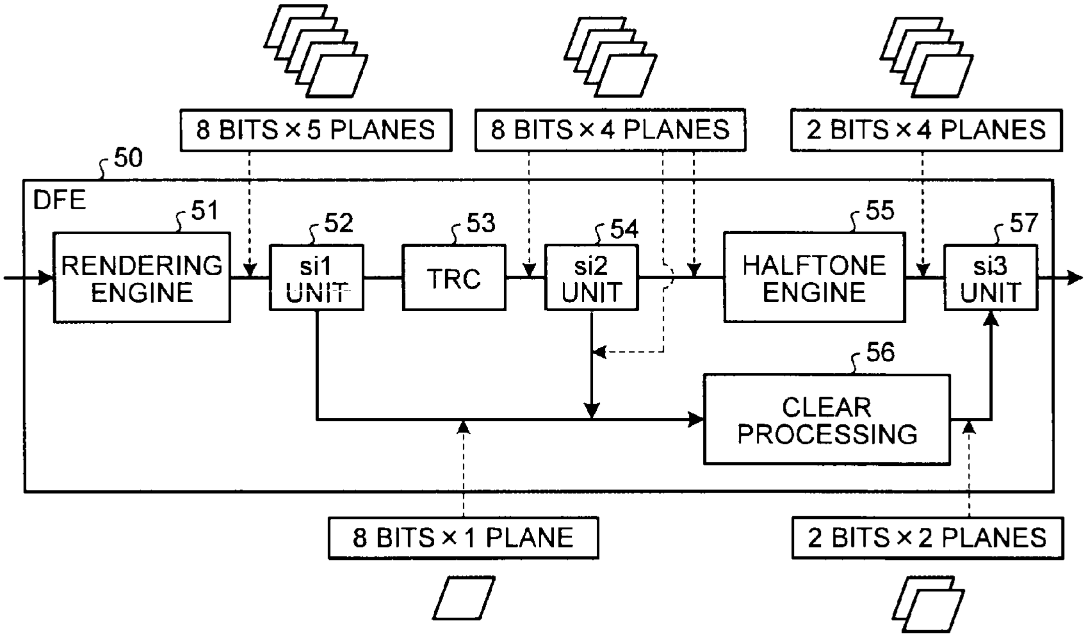
FIG. 13 is a diagram illustrating a correspondence relation of a drawing object, a coordinate, and a concentration value in the gloss-control image data illustrated in FIG. 4.
FIG. 14 is a diagram of a functional configuration example of a DFE.

At Step S34, when it is determined that the process from Step S31 to Step S33 is completed on all of the drawing objects in the target image (YES at Step S34), the plane-data generating unit 122 completes generation of the gloss-control image data. As a result, the gloss-control image data illustrated in FIG. 8 is generated. FIG. 13 is a diagram illustrating a correspondence relation of the drawing object, the coordinate, and the concentration value in the gloss-control image data illustrated in FIG. 8.

Referring back to FIG. 11, when the gloss-control image data is generated, the plane-data generating unit 122 generates original data by integrating the gloss-control image data and the image data of the target image and sends the original data to the print-data generating unit 123. The print-data generating unit 123 generates print data based on the original data (Step S15). As described above, the print data is generated.

A functional configuration of the DFE 50 will be explained below. As illustrated in FIG. 14 for example, the DFE 50 includes a rendering engine 51, an si1 unit 52, a Tone Reproduction Curve (TRC) 53, an si2 unit 54, a halftone engine 55, a clear processing 56, an si3 unit 57, and the surface-effect selection table (not illustrated). The rendering engine 51, the si1 unit 52, the TRC 53, the si2 unit 54, the halftone engine 55, the clear processing 56, and the si3 unit 57 are realized by causing a control unit of the DFE 50 to execute various types of programs stored in a main storage unit or an auxiliary storage unit. The si1 unit 52, the si2 unit 54, and the si3 unit 57 have functions of separating image data and integrating image data. The surface-effect selection table is stored in, for example, the auxiliary storage unit.

The rendering engine 51 receives input of the image data (for example, print data shown in FIG. 10) sent from the host device 10. The rendering engine 51 interprets language of the input image data, converts the image data represented by the vector format to image data represented by the raster format, converts a color space represented by an RGB format or the like to a color space represented by a CMYK format, and outputs pieces of 8-bit image data of respective CMYK planes (hereinafter, described as "8-bit CMYK image data") and 8-bit image data of a gloss control plane (hereinafter, described as "8-bit gloss-control image data"). The si1 unit 52 outputs each piece of the 8-bit CMYK image data to the TRC 53 and outputs the 8-bit gloss-control image data to the clear processing 56.

The DFE 50 converts the gloss-control image data in the vector format output from the host device 10 to image data in the raster format. Therefore, the DFE 50 outputs the gloss-control image data, in which the type of the surface effect, which is to be applied to the drawing object specified by a user via the image processing application, is set as the concentration value for each pixel.

The rendering engine 51 receives input of the image data (for example, print data shown in FIG. 10) sent from the host device 10. The rendering engine 51 interprets language of the input image data, converts the image data represented by the vector format to image data represented by the raster format, converts a color space represented by an RGB format or the like to a color space represented by a CMYK format, and outputs pieces of 8-bit image data of respective CMYK planes (hereinafter, described as "8-bit CMYK image data") and 8-bit image data of a gloss control plane (hereinafter, described as "8-bit gloss-control image data"). The si1 unit 52 outputs each piece of the 8-bit CMYK image data to the TRC 53 and outputs the 8-bit gloss-control image data to the clear processing 56.

The clear processing 56 receives, via the si1 unit 52, the 8-bit gloss-control image data that has been converted by the rendering engine 51 and also receives, via the sit unit 54, each piece of the 8-bit CMYK image data that has been subjected to the gamma correction by the TRC 53. The clear processing 56 determines a surface effect corresponding to the concentration value (the pixel value) of each pixel contained in the gloss-control image data by referring to the surface-effect selection table to be described below by using the input gloss-control image data, and determines on or off of the glosser 80 in accordance with the determination of the surface effect. Furthermore, the clear processing 56 appropriately generates an inverse mask or a solid mask by using the input pieces of the 8-bit CMYK image data and appropriately generates 2-bit clear-toner image data for attaching a clear toner. Thereafter, the clear processing 56 appropriately generates clear-toner image data used by the printer 70 and clear-toner image data used by the low-temperature fixing device 90, and outputs the pieces of the image data together with on-off information indicating on or off of the glosser 80.

The inverse mask is used for equalizing the total amount of the CMYK toners and the clear toner attached to each pixel contained in a target region to which the surface effect is to be applied. More specifically, image data that is obtained by adding the concentration values of pixels contained in the target region in all pieces of the CMYK image data and then subtracting the sum from a predetermined value is used as the inverse mask. For example, an inverse mask 1 as described above can be represented by the following Equation 1.

$$Clr=100-(C+M+Y+K)$$

$$\text{where, when } Clr<0,\ Clr=0 \tag{1}$$

In Equation 1, Clr, C, M, Y, and K represent concentration ratios calculated from the concentration value of each pixel for each of the clear toner and the toners C, M, Y, and K. That is, by Equation 1, the total amount of the attached toner as a sum of the total amount of the attached toners C, M, Y, and K and the amount of the attached clear toner is set to 100% for each pixel contained in the target region to which the surface effect is to be applied. When the total amount of the attached toners C, M, Y, and K is equal to or greater than 100%, the clear toner is not to be attached and the concentration ratio of the clear toner is set to 0%. This is because a portion where the total amount of the attached toners C, M, Y, and K exceeds 100% is to be smoothed by a fixing process. As described above, by setting the total amount of the attached toner on each pixel contained in the target region to which the surface effect is to be applied to 100% or greater, it becomes possible to remove the surface irregularity caused by a difference in the total amount of the attached toner in the target region. As a result, gloss is obtained by specular reflection of light. The inverse mask may be obtained by methods other than using Equation 1, and there may be various types of the inverse masks.

For example, the inverse mask may be structured so that the clear toner is uniformly attached to each pixel. The inverse mask of this type is called a solid mask and represented by the following Equation 2.

$$Clr=100 \tag{2}$$

It is possible to set a concentration ratio other than 100% to some of the pixels in the target region to which the surface effect is to be applied. Therefore, there may be various patterns of the solid masks.

The inverse mask may be obtained by multiplication of background exposure ratios of the respective colors. The inverse mask of this type is represented by, for example, the following Equation 3.

$$Clr=100\times\{(100-C)/100\}\times\{(100-M)/100\}\times\{(100-Y)/100\}\times\{(100-K)/100\} \tag{3}$$

In the above Equation 3, (100−C)/100 represents a background exposure ratio of C, (100−M)/100 represents a background exposure ratio of M, (100−Y)/100 represents a background exposure ratio of Y, and (100−K)/100 represents a background exposure ratio of K.

The inverse mask may be obtained by a method based on the assumption that halftone dots having the maximum area ratio regulates the smoothness. The inverse mask of this type is represented by, for example, the following Equation 4.

$$Clr=100-\max(C,M,Y,K) \tag{4}$$

In the above Equation 4, max (C, M, Y, K) indicates that a concentration value of a color having the maximum concentration value among CMYK is used as a representative value.

Thus, any of the inverse masks represented by any of the above Equations 1 to 4 is applicable.

The surface-effect selection table is a table containing a correspondence relation of a concentration value being a gloss control value indicating a surface effect; a type of the surface effect; control information related to a post processing device corresponding to the configuration of the image forming system; clear-toner image data used by the printer 70; and clear-toner image data used by the post processing device. The image forming system can be configured in various ways; however, according to the present embodiment, the glosser 80 and the low-temperature fixing device 90 serving as the post processing devices are connected to the printer 70. Therefore, the control information related to the post processing device corresponding to the configuration of the image forming system is the on-off information indicating on or off of the glosser 80. Furthermore, the clear-toner image data used by the post processing device includes clear-toner image data used by the low-temperature fixing device 90. FIG. 15 is a diagram illustrating an exemplary data structure of the surface-effect selection table. The surface-effect selection table may be structured to indicate the correspondence relation of the control information related to the post processing device, clear-toner image data 1 used by the printer 70, clear-toner image data 2 used by the post processing device, the concentration value, and the type of the surface effect, in accordance with each of the configurations of different image forming systems. In FIG. 15, the data structure corresponding to the configuration of the image forming system according to the first embodiment is illustrated by way of example. In the correspondence relation between the type of the surface effect and the concentration value illustrated in the figure, each type of the surface effect is associated with a corresponding range of the concentration values. Furthermore, each type of the surface effect is associated with a corresponding percentage of the concentration (concentration ratio), which is calculated from a value representing the range of the concentration value (i.e., the representative value), for every 2% change in the concentration ratio. More specifically, the surface effect for applying gloss (the specular effect and the solid effect) is associated with a range of the concentration values ("212" to "255") having the concentration ratios of 84% or greater, and the surface effect for suppressing gloss (the halftone-dot matt and the matt) is associated with a range of the concentration values ("1" to "43") having the concentration ratios of 16% or smaller. The surface effect, such as a texture or a background watermark, is associated with a range of the concentration values having the concentration ratios of 20% to 80%.

More specifically, the specular gloss (PM: Premium Gloss) as the surface effect is associated with the pixel values of "238" to "255" such that different types of specular gloss are associated with the following three respective ranges of pixel values: "238" to "242"; "243" to "247"; and "248" to "255". The solid gross (G: Gross) is associated with the pixel values of "212" to "232" such that different types of solid gloss are associated with the following four respective ranges of pixel values: "212" to "216"; "217" to "221"; "222" to "227"; and "228" to "232". The halftone-dot matt (M: Matt) is associated with pixel values of "23" to "43" such that different types of halftone-dot matt are associated with the following four respective ranges of pixel values: "23" to "28"; "29" to "33"; "34" to "38"; and "39" to "43". The matt (PM: Premium Matt) is associated with pixel values of "1" to "17" such that different types of matt are associated with the following three respective ranges of pixel values: "1" to "7"; "8" to "12"; and "13" to "17". The different types of the same surface effect are different from one another in terms of equations used for obtaining the clear-toner image data used by the printer or the low-temperature fixing device, but the operations performed by the printer main body and the post processing devices are the same. Information indicating that no surface effect is to be applied is associated with the concentration value of "0".

In FIG. 15, the on-off information indicating on or off of the glosser 80, contents of the clear-toner image data 1 (Clr−1 shown in FIG. 1) used by the printer 70, and contents of the clear-toner image data 2 (Clr−2 shown in FIG. 1) used by the low-temperature fixing device 90 are also indicated in association with the pixel values and the surface effects. For example, when the surface effect is the specular gloss, it is indicated that the glosser 80 is to be on, the clear-toner image data 1 used by the printer 70 is an inverse mask, and there is no data as the clear-toner image data 2 used by the low-temperature fixing device 90. The inverse mask is obtained by, for example, the above Equation 1. The example illustrated in FIG. 15 is a case in which the specular effect is specified as the surface effect for the whole region defined by the image data. A case in which the specular effect is specified as the surface effect for a part of the whole region defined by the image data will be explained below.

When the concentration value is in the range of "228" to "232" and the solid gloss is specified as the surface effect, it is indicated that the glosser 80 is to be off, the inverse mask 1 is used as the clear-toner image data 1 used by the printer 70, and there is no data as the clear-toner image data 2 used by the low-temperature fixing device 90. The inverse mask 1 can be any inverse mask represented by any of the above Equations 1 to 4. This is because, because the glosser 80 is off, the total amounts of the attached toners to be smoothed remain different and the surface irregularity increases due to the specular gloss, so that the solid gloss having the glossiness lower than that of the specular gloss can be obtained. When the surface effect is the halftone-dot matt, it is indicated that the glosser 80 is to be off, halftone (halftone dot) is used as the clear-toner image data 1 used by the printer 70, and there is no data as the clear-toner image data 2 used by the low-temperature fixing device 90. When the surface effect is the matt, it is indicated that the glosser 80 can be either on or off, there is no data as the clear-toner image data 1 used by the printer 70, and a solid mask is used as the clear-toner image data 2 used by the low-temperature fixing device 90. The solid mask is obtained by, for example, the above Equation 2.

The clear processing 56 determines the surface effect associated with each pixel value indicated in the gloss-control image data by referring to the above surface-effect selection table, determines on or off of the glosser 80, and determines clear-toner image data used by each of the printer 70 and the low-temperature fixing device 90. The clear processing 56 determines on or off of the glosser 80 for every one page. The clear processing 56 appropriately generates the clear-toner image data as described above in accordance with the result of the determination, outputs the image data, and outputs the on-off information on the glosser 80.

The si3 unit 57 integrates the pieces of the 2-bit CMYK image data obtained by the halftone processing and the 2-bit clear-toner image data generated by the clear processing 56, and outputs the integrated image data to the MIC 60. In some cases, the clear processing 56 does not generate at least one of the clear-toner image data used by the printer 70 and the clear-toner image data used by the low-temperature fixing device 90. Therefore, the si3 unit 57 integrates the clear-toner image data generated by the clear processing 56. If the clear processing 56 does not generate both pieces of the clear-toner image data, the si3 unit 57 outputs image data in which the pieces of the 2-bit CMYK image data are integrated. As a result, the DFE 50 sends four to six pieces of 2-bit image data to the MIC 60. The si3 unit 57 also outputs the on-off information on the glosser 80, which has been output by the clear processing 56, to the MIC 60.

Figure 16:
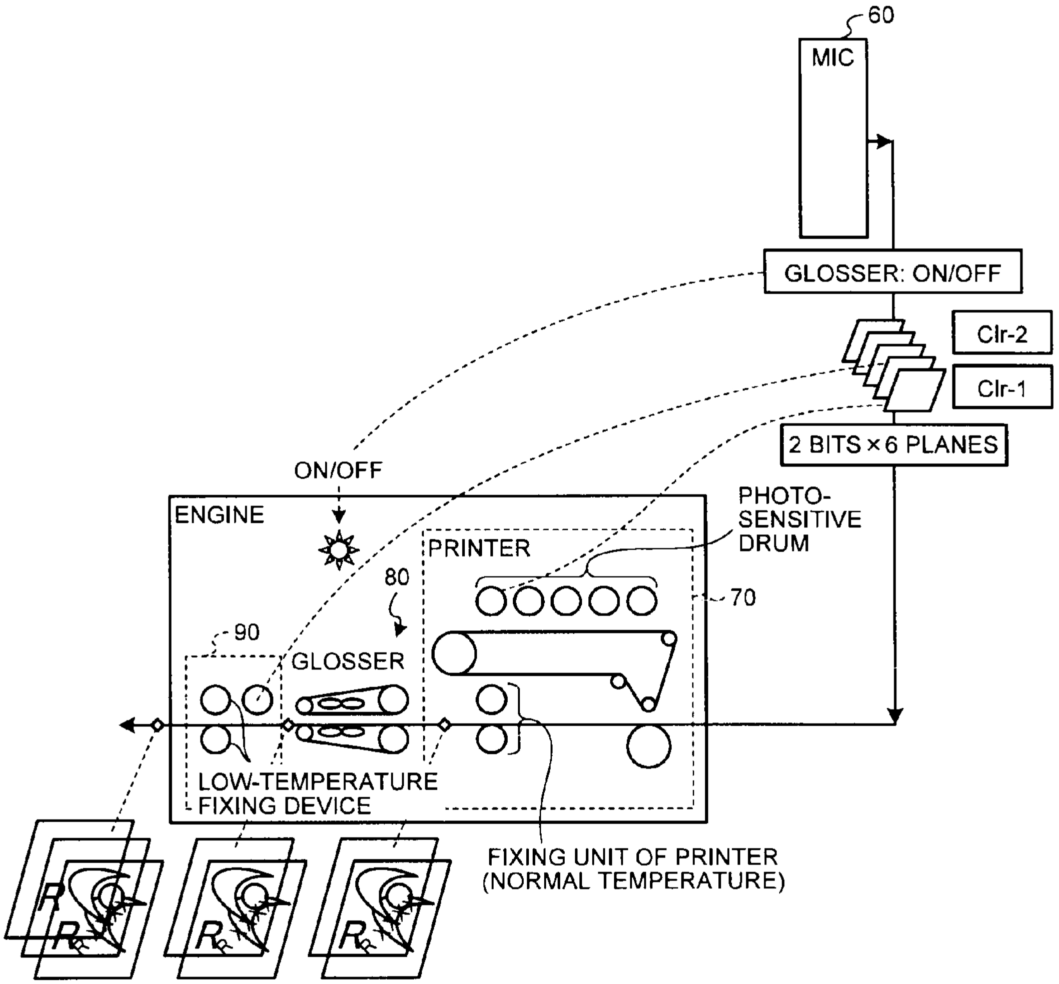
FIG. 16 is a diagram schematically illustrating an exemplary structure of an MIC.

The MIC 60 is connected to the DFE 50 and the printer 70, receives the color image data and the clear-toner image data from the DFE 50, distributes the received pieces of image data to their corresponding devices, and controls the post processing device. More specifically, as illustrated in FIG. 16, the MIC 60 outputs the pieces of the CMYK image data to the printer 70 from among the pieces of the image data output from the DFE 50, outputs the clear-toner image data used by the printer 70 to the printer 70 when this image data is present, turns on or off the glosser 80 by using the on-off information output form the DFE 50, and outputs the clear-toner image data used by the low-temperature fixing device 90 to the low-temperature fixing device 90 when this image data is present. The glosser 80 may switch between a pathway in which the fixing operation is performed and a pathway in which the fixing operation is not performed, depending on the on-off information. The low-temperature fixing device 90 may switch on and off in accordance with the presence or absence of the clear-toner image data or may switch between the pathways similarly to the glosser 80.

Figure 17:
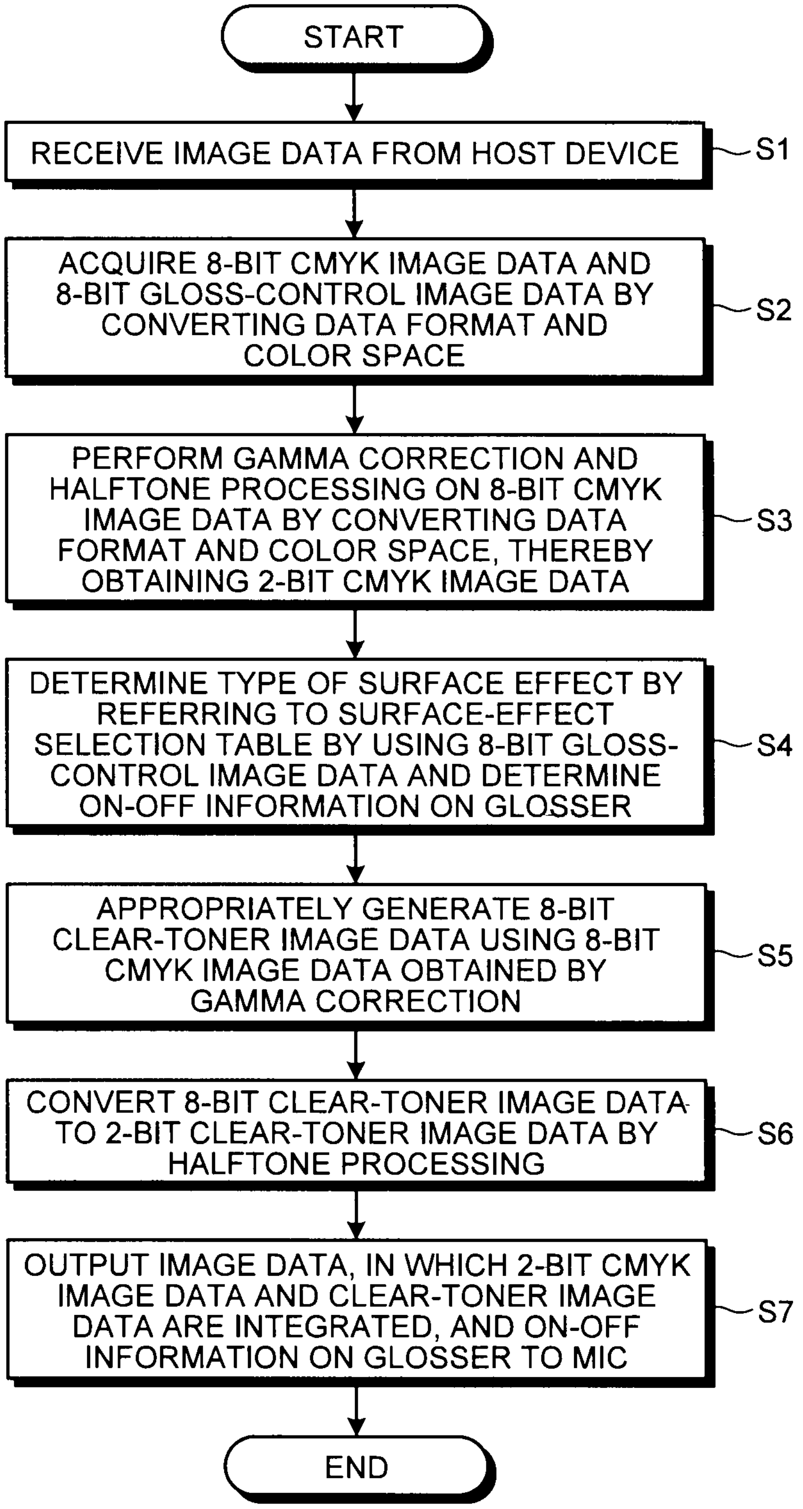
FIG. 17 is a flowchart of a procedure of a gloss control process performed by the image forming system.

A gloss control process performed by the image forming system according to the embodiment will be explained below with reference to FIG. 17. When the DFE 50 receives image data from the host device 10 (Step S1), the rendering engine 51 interprets the language of the image data, converts the image data represented in the vector format to image data represented in the raster format, and converts the color space represented by the RGB format to a color space represented by the CMYK format to thereby obtain each piece of 8-bit CMYK image data and 8-bit gloss-control image data (Step S2).

Figure 18:
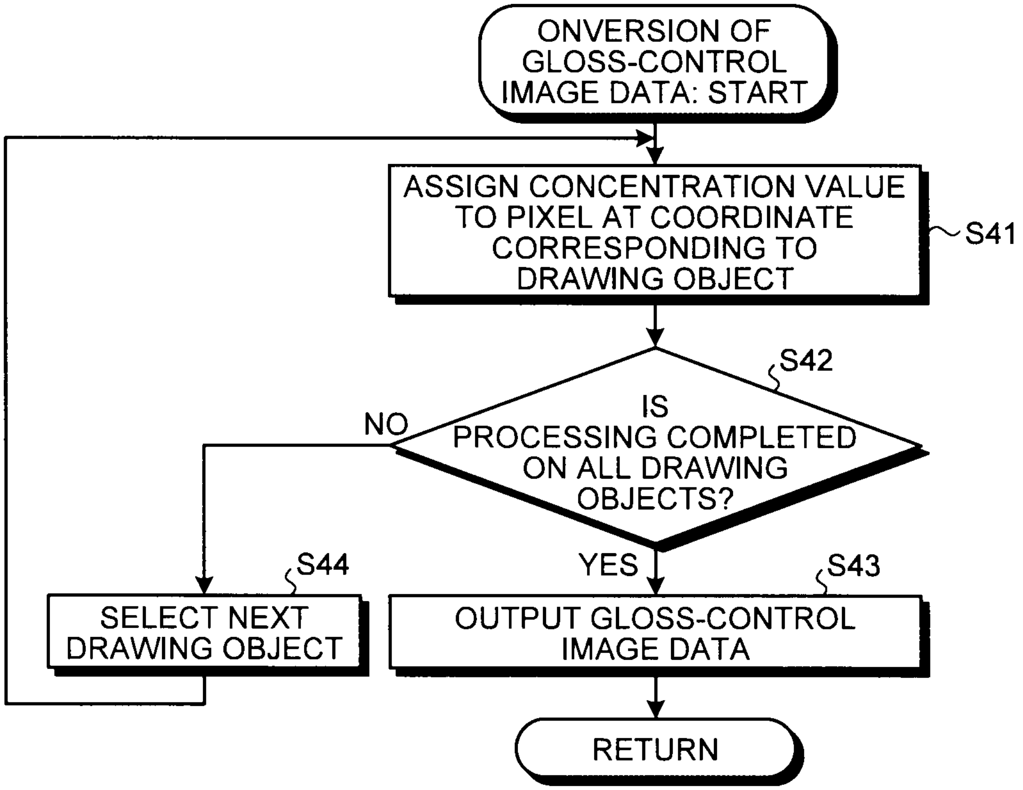
FIG. 18 is a flowchart of a procedure of a process for converting gloss-control image data.

The process for converting the gloss-control image data at Step S2 will be explained in detail below. FIG. 18 is a flowchart of a procedure of the process for converting the gloss-control image data. In the conversion process, the gloss-control image data illustrated in FIG. 8, that is, the gloss-control image data in which the concentration value for identifying the surface effect is specified for each drawing object as illustrated in FIG. 13, is converted to gloss-control image data in which the concentration value is specified for each pixel contained in each drawing object.

The rendering engine 51 assigns a concentration value set for a drawing object to each pixel in the range of the coordinates corresponding to the drawing object in the gloss-control image data as illustrated in FIG. 13 (Step S41), thereby converting the gloss-control image data. Thereafter, the rendering engine 51 determines whether the process is completed on all of the drawing objects contained in the gloss-control image data (Step S42).

When the process is not completed on any of the drawing objects (NO at Step S42), the rendering engine 51 selects a next drawing object that is not processed in the gloss-control image data (Step S44), and repeats the process at Step S41.

On the other hand, at Step S42, when the process at Step S41 is completed on all of the drawing objects contained in the gloss-control image data (YES at Step S42), the rendering engine 51 outputs the converted gloss-control image data (Step S43). Through the above process, the gloss-control image data is converted to the data in which the surface effect is set for each pixel.

Referring back to FIG. 17, when the 8-bit gloss-control image data is output, the TRC 53 of the DFE 50 performs gamma correction on each piece of the 8-bit CMYK image data by using a 1D_LUT based gamma curve generated by calibration. The halftone engine 55 performs halftone processing on the image data obtained by the gamma correction in order to convert the pieces of the image data to pieces of 2-bit CMYK image data to be output to the printer 70, so that the pieces of the 2-bit CMYK image data are obtained through the halftone processing (Step S3).

The clear processing 56 of the DFE 50 determines a surface effect specified for each pixel value indicated in the gloss-control image data by referring to the surface-effect selection table by using the 8-bit gloss-control image data. The clear processing 56 performs the above determination on all of the pixels contained in the gloss-control image data. In the gloss-control image data, all pixels contained in a region to which the same surface effect is applied basically have the concentration values in the same range. Therefore, the clear processing 56 determines that pixels near the pixels that are determined to have the same surface effect are contained in the region to which the same surface effect is applied. As described above, the clear processing 56 identifies the region to which the surface effect is applied and the type of the surface effect to be applied to the region. The clear processing 56 determines on or off of the glosser 80 in accordance with the determination (Step S4).

The clear processing 56 of the DFE 50 appropriately generates 8-bit clear-toner image data for attaching the clear toner by appropriately using each piece of the 8-bit CMYK image data obtained by the gamma correction (Step S5). The halftone engine 55 converts the 8-bit clear-toner image data based on the 8-bit image data to 2-bit clear-toner image data through the halftone processing (Step S6).

The si3 unit 57 of the DFE 50 integrates the pieces of the 2-bit CMYK image data obtained by the halftone processing at Step S3 and the 2-bit clear-toner image data generated at Step S6, and outputs the integrated image data and the on-off information indicating on or off of the glosser 80 determined at Step S4 to the MIC 60 (Step S7).

At Step S5, when the clear processing 56 does not generate the clear-toner image data, only the pieces of the 2-bit CMYK based image data obtained by the halftone processing at Step S3 are integrated and the integrated image data is output at Step S7.

Concrete examples of the types of the surface effects will be explained below. In the following, each type of the specular gloss and the solid gloss for applying gloss and each type of the halftone-dot matt and the matt for suppressing gloss will be explained in detail. In the following, an example will be described in which the same type of the surface effect is specified in one page. At Step S4, the clear processing 56 of the DFE 50 determines that the specular gloss is specified as the surface effect for pixels having the concentration values of "238" to "255" by referring to the surface-effect selection table illustrated in FIG. 15 by using the concentration value of each pixel in the 8-bit gloss-control image data. In this case, the clear processing 56 of the DFE 50 further determines whether the region in which the specular gloss is specified as the surface effect corresponds to the whole region defined by the image data. When the specular gloss is specified for the whole region, the clear processing 56 of the DFE 50 generates the inverse mask 1 according to, for example, Equation 1 by using image data of the region in each piece of the 8-bit CMYK image data obtained by the gamma correction. Data representing the inverse mask is used as the clear-toner image data used by the printer 70. Because the low-temperature fixing device 90 does not use clear-toner image data for the region, the DFE 50 does not generate the clear-toner image data to be used by the low-temperature fixing device 90. At Step S7, the si3 unit 57 of the DFE 50 integrates the clear-toner image data used by the printer 70 and the pieces of the 2-bit CMYK image data obtained by the halftone processing at Step S3, and outputs the integrated image data and the on-off information indicating on of the glosser 80 to the MIC 60. The MIC 60 outputs, to the printer 70, each piece the CMYK image data and the clear-toner image data used by the printer 70, which are the image data output from the DFE 50, and turns on the glosser 80 by using the on-off information output from the DFE 50. The printer 70 forms toner images corresponding to the respective toners on the photosensitive elements by applying light beams from the exposing device by using the pieces of the CMYK image data and the clear-toner image data output form the MIC 60, transfers the toner images on a transfer sheet, and fixes the toner images to the transfer sheet by applying heat and pressure at a normal temperature. Consequently, the CMYK toners and the clear toner are attached to the transfer sheet, so that an image is formed. Thereafter, the glosser 80 applies pressure to the transfer sheet at high temperature and high pressure. Because the clear-toner image data is not output to the low-temperature fixing device 90, the low-temperature fixing device 90 discharges the transfer sheet without attaching the clear toner. Therefore, the total amount of the attached CMYK toners and the attached clear toner is uniformly compressed over the whole region defined by the image data, so that intensive gloss can be obtained on the surface of the region.

On the other hand, when the region in which the specular gloss is specified as the surface effect corresponds to a part of the whole region defined by the image data, the following situations may occur. The clear-toner image data representing the above inverse mask is used for the region in which the specular gloss is specified. However, if the total attachment value of the CMYK toners set to each pixel in a region other than the specified region is equal to or greater than a predetermined value, and when the glosser 80 applies pressure, the total amounts of the attached CMYK toners and the attached clear toner are equalized between the region in which the specular gloss is specified and the region in which the total attachment values of the CMYK toners are equal to or greater than the predetermined value.

For example, when the total attachment values of the CMYK toners set to all of the pixels contained in the region defined by the image data are equal to or greater than the predetermined value, the same result is obtained as that obtained when the specular gloss is specified for the whole region defined by the image data.

Therefore, when the specular gloss is specified as the surface effect for a part of the whole region defined by the image data, the DFE 50 generates the same clear-toner image data as that generated when the specular gloss is specified for the whole region defined by the image data. After the clear toner is attached to the transfer sheet, pressure is applied by the glosser 80. Thereafter, the DFE 50 generates clear-toner image data used by the low-temperature fixing device 90 in order to apply a matt surface effect to the region other than the region in which the specular effect is specified as the surface effect on the transfer sheet that has been pressurized by the glosser 80.

More specifically, the DFE 50 generates, as the clear-toner image data used by the printer 70, the inverse mask according to Equation 1 similarly to the above. The DFE 50 also generates, as the clear-toner image data used by the low-temperature fixing device 90, the solid mask according to Equation 2 for the region other than the region in which the specular effect is specified as the surface effect. At Step S7, the si3 unit 57 of the DFE 50 integrates the clear-toner image data used by the printer 70, the clear-toner image data used by the low-temperature fixing device 90, and the pieces of the 2-bit CMYK image data obtained by the halftone processing at Step S3, and outputs the integrated image data and the on-off information indicating on of the glosser 80 to the MIC 60.

The MIC 60 outputs, to the printer 70, the pieces of the CMYK image data and the clear-toner image data used by the printer 70 from among the pieces of the image data output from the DFE 50, turns on the glosser 80 by using the on-off information output from the DFE 50, and outputs, to the low-temperature fixing device 90, the clear-toner image data used by the low-temperature fixing device 90 from among the pieces of the image data output from the DFE 50. The printer 70 forms an image to which the CMYK toners and the clear toner are attached on a transfer sheet by using the pieces of the CMYK image data and the clear-toner image data output from the MIC 60. Thereafter, the glosser 80 applies pressure to the transfer sheet at high temperature and high pressure. The low-temperature fixing device 90 forms a toner image with the clear toner by using the clear-toner image data output form the MIC 60, superimposes the toner image on the transfer sheet that has passed through the glosser 80, and fixes the toner image to the transfer sheet by applying heat and pressure at a low temperature. As a result, the total amount of the attached CMYK toners and the attached clear toner is uniformly compressed in the region in which the specular gloss is specified, so that intensive gloss can be obtained on the surface of the region. On the other hand, because the clear toner is attached by the solid mask after the glosser 80 applies the pressure, surface irregularity occurs in the region other than the region in which the specular gloss is specified, so that the gloss on the surface of the region can be suppressed.

For another example, at Step S4, the clear processing 56 of the DFE 50 determines that the solid gloss is specified as the surface effect for pixels having the concentration values of "212" to "232" by referring to the surface-effect selection table by using the concentration value of each pixel in the 8-bit gloss-control image data. In particular, the clear processing 56 determines that a solid gloss type 1 is specified for pixels having the concentration values of "228" to "232". In this case, the clear processing 56 of the DFE 50 generates the inverse mask 1 by using image data of the region in each piece of the 8-bit CMYK image data obtained by the gamma correction. Data representing the inverse mask 1 is used as the clear-toner image data used by the printer 70. Because the low-temperature fixing device 90 does not use clear-toner image data for the region, the DFE 50 does not generate the clear-toner image data used by the low-temperature fixing device 90. At Step S7, the si3 unit 57 of the DFE 50 integrates the clear-toner image data used by the printer 70 and the pieces of the 2-bit CMYK image data obtained by the halftone processing at Step S3, and outputs the integrated image data and the on-off information indicating off of the glosser 80 to the MIC 60. The MIC 60 outputs, to the printer 70, the pieces of the CMYK image data and the clear-toner image data used by the printer 70, which are the image data output from the DFE 50, and turns off the glosser 80 by using the on-off information output from the DFE 50. The printer 70 forms an image to which the CMYK toners and the clear toner are attached on the transfer sheet by using the pieces of the CMYK image data and the clear-toner image data used by the printer 70, which are output from the MIC 60. Because the glosser 80 is off, pressure is not applied to the transfer sheet at high temperature and high pressure. Furthermore, because the clear-toner image data is not output to the low-temperature fixing device 90, the low-temperature fixing device 90 discharges the transfer sheet without attaching the clear toner. Therefore, the total amount of the attached CMYK toners and the attached clear toner becomes relatively uniform in the region in which the solid gloss is specified as the surface effect. As a result, relatively intensive gloss can be obtained on the surface of the region.

For another example, at Step S4, the clear processing 56 of the DFE 50 determines that the halftone-dot matt is specified as the surface effect for pixels having the concentration values of "23" to "43" by referring to the surface-effect selection table by using the concentration value of each pixel in the 8-bit gloss-control image data. In this case, the clear processing 56 of the DFE 50 generates image data representing halftone as the clear-toner image data used by the printer 70. Because the low-temperature fixing device 90 does not use clear-toner image data for the region, the DFE 50 does not generate the clear-toner image data used by the low-temperature fixing device 90. At Step S7, the si3 unit 57 of the DFE 50 integrates the clear-toner image data used by the printer 70 and the pieces of the 2-bit CMYK image data obtained by the halftone processing at Step S3, and outputs the integrated image data and the on-off information indicating off of the glosser 80 to the MIC 60. The MIC 60 outputs, to the printer 70, the pieces of the CMYK image data and the clear-toner image data used by the printer 70, which are the image data output from the DFE 50, and turns off the glosser 80 by using the on-off information output from the DFE 50. The printer 70 forms an image to which the CMYK toners and the clear toner are attached on the transfer sheet by using the pieces of the CMYK image data and the clear-toner image data output from the MIC 60. Because the glosser 80 is off, pressure is not applied to the transfer sheet at high temperature and high pressure. Furthermore, because the clear-toner image data is not output to the low-temperature fixing device 90, the low-temperature fixing device 90 discharges the image data without attaching the clear toner. Consequently, because the halftone dots are added with the clear toner, surface irregularity occurs in the region in which the halftone-dot matt is specified as the surface effect, so that the gloss on the surface of the region can be relatively suppressed.

For another example, at Step S4, the clear processing 56 of the DFE 50 determines that the matt is specified as the surface effect for pixels having the concentration values of "1" to "17" by referring to the surface-effect selection table by using the concentration value of each pixel in the 8-bit gloss-control image data. In this case, when other surface effect is specified in the same page (to be described later), the clear processing 56 of the DFE 50 determines on or off of the glosser 80 in accordance with the setting of the other surface effect. Regardless of whether the glosser 80 is on or off, the clear processing 56 does not generate the clear-toner image data used by the printer 70 but generates a solid mask as the clear-toner image data used by the low-temperature fixing device 90. At Step S7, the si3 unit 57 of the DFE 50 integrates the clear-toner image data used by the low-temperature fixing device 90 and the pieces of the 2-bit CMYK image data obtained by the halftone processing at Step S3, and outputs the integrated image data and the on-off information indicating on or off of the glosser 80 to the MIC 60. The MIC 60 outputs, to the printer 70, the pieces of the CMYK image data from among the pieces of the image data output from the DFE 50, and outputs, to the low-temperature fixing device 90, the clear-toner image data used by the low-temperature fixing device 90 from among the pieces of the image data output form the DFE 50. The printer 70 forms an image to which the CMYK toners are attached on the transfer sheet by using the pieces of the CMYK image data output from the MIC 60. When the glosser 80 is turned on, pressure is applied to the transfer sheet at high temperature and high pressure. When the glosser 80 is turned off, pressure at high temperature and high pressure is not applied to the transfer sheet. The low-temperature fixing device 90 forms a toner image with the clear toner by using the clear-toner image data output from the MIC 60, superimposes the toner image on the transfer sheet that has passed through the glosser 80, and fixes the toner image to the transfer sheet by applying heat and pressure at a low temperature. Consequently, because the clear toner is attached by the solid mask, surface irregularity occurs in the region in which the matt is specified as the surface effect, so that the gloss on the surface of the region can be suppressed.

In the above examples, the cases that the same surface effect is specified in one page are described. However, a case that different types of surface effects are specified in one page can be realized by the same processes as described above. Specifically, when a plurality of surface effects are specified in one page, a concentration value corresponding to each type of the surface effects illustrated in FIG. 15 is set to each pixel contained in a region to which each type of the surface effects is applied in the gloss-control image data. More specifically, in the gloss-control image data, a region to be applied with a surface effect is specified according to each type of the surface effects; therefore, the DFE 50 can determine that a range of pixels having the same concentration values in the gloss-control image data becomes a region to which the same surface effect is applied. Consequently, it is possible to easily realize each surface effect in one page.

However, when a plurality of types of surface effects are specified in one page by using the concentration values in the gloss-control image data, because it is difficult to switch on and off of the glosser 80 in the same page, there are combinations of the types of the surface effects that can be realized simultaneously, while there are combinations of the types of the surface effects that cannot be realized simultaneously.

According to the embodiment in which the configuration including the printer 70, the glosser 80, and the low-temperature fixing device 90 is employed as illustrated in FIG. 1, when the specular gloss (PG) and the matt (PM) are specified as the surface effects in one page, the glosser 80 is turned on for the specular gloss (PM) but the on or off of the glosser 80 for the matt (PM) depends on the setting of the other surface effect in the same page according to FIG. 15. Therefore, it is possible to simultaneously realize these two types of the surface effects in one page.

In this case, at Step S4, the clear processing 56 of the DFE 50 determines that the specular gloss (PM) is specified as the surface effect for a region corresponding to pixels having the concentration values of "238" to "255" by referring to the surface-effect selection table illustrated in FIG. 15 by using the concentration value of each pixel in the 8-bit gloss-control image data. Then, the clear processing 56 of the DFE 50 generates an inverse mask according to, for example, Equation 1 by using the image data corresponding to the region in each piece of the 8-bit CMYK image data obtained by the gamma correction. Data representing the inverse mask is used as the clear-toner image data used by the printer 70 for the region in which the specular gloss (PM) is specified as the surface effect. Because the low-temperature fixing device 90 does not use clear-toner image data for the region in which the specular gloss is specified, the DFE 50 does not generate the clear-toner image data used by the low-temperature fixing device 90 for the region in which the specula gloss is specified.

Furthermore, at Step S4, the clear processing 56 of the DFE 50 determines that the matt (PM) is specified as the surface effect for the region corresponding to pixels having the concentration values of "1" to "17" in the same page by referring to the surface-effect selection table similarly to the above. In this case, the clear processing 56 of the DFE 50 determines that the on-off information indicates on of the glosser 80 in accordance with the setting of the specular gloss that is the other surface effect in the same page. The clear processing 56 does not generate the clear-toner image data used by the printer 70 for the region in which the matt is specified, but generates a solid mask for the region in which the matt is specified as the clear-toner image data used by the low-temperature fixing device 90.

At Step S7, the si3 unit 57 of the DFE 50 integrates the clear-toner image data used by the printer 70 for the region in which the specular gloss is specified, the clear-toner image data used by the low-temperature fixing device 90 for the region in which the matt is specified, and the pieces of the 2-bit CMYK image data obtained by the halftone processing at Step S3, and outputs the integrated image data and the on-off information indicating on of the glosser 80 to the MIC 60.

The MIC 60 outputs, to the printer 70, the pieces of the CMYK image data and the clear-toner image data used by the printer 70 for the region in which the specular gloss is specified, from among the pieces of the image data output from the DFE 50. The MIC 60 also outputs, to the low-temperature fixing device 90, the clear-toner image data used by the low-temperature fixing device 90 for the region in which the matt is specified, from among the pieces of the image data output form the DFE 50, and turns on the glosser 80 by using the on-off information output from the DFE 50.

The printer 70 forms toner images corresponding to the respective toners on the photosensitive elements by applying light beams from the exposing device by using the pieces of the CMYK image data output from the MIC 60 and the clear-toner image data used for the region in which the specular gloss is specified and output form the MIC 60; transfers the toner images to a transfer sheet; and fixes the toner images to the transfer sheet by applying heat and pressure at a normal temperature. Consequently, the CMYK toners and the clear toner are attached to the transfer sheet, so that an image is formed. Thereafter, the glosser 80 applies pressure to the transfer sheet at high temperature and high pressure.

The low-temperature fixing device 90 forms a toner image with the clear toner by using the clear-toner image data used for the region in which the matt is specified and output form the MIC 60; superimposes the toner image on the transfer sheet that has passed through the glosser 80; and fixes the toner image to the transfer sheet by applying heat and pressure at a low temperature. Therefore, intensive gloss can be obtained on the surface of the region in which the specular gloss is specified as the surface effect. Furthermore, because the clear toner is attached by the solid mask, surface irregularity occurs in the region in which the matt is specified as the surface effect, so that the gloss on the surface of the region can be suppressed.

For another example, in the configuration of the embodiment, when the solid gloss (G), the halftone-dot matt (M), and the matt (PM) are specified as the surface effects in one page, the glosser 80 is turned off for the solid gloss (G) and the halftone-dot matt (M) but the on or off of the glosser 80 for the matt (PM) depends on the setting of the other surface effects according to FIG. 15. Therefore, it is possible to simultaneously realize these three types of the surface effects in one page.

This case will be explained in detail below. At Step S4, the clear processing 56 of the DFE 50 determines that the solid gloss is specified as the surface effect for pixel having the concentration values of “212” to “232” by referring to the surface-effect selection table by using the concentration value of each pixel in the 8-bit gloss-control image data. In particular, the clear processing 56 determines that the solid gloss type 1 is specified for pixels having the concentration values of “228” to “232”. In this case, the clear processing 56 of the DFE 50 generates the inverse mask 1 by using the image data corresponding to the region in each piece of the 8-bit CMYK image data obtained by the gamma correction. Data representing the inverse mask 1 is used as the clear-toner image data used by the printer 70. Because the low-temperature fixing device 90 does not use clear-toner image data for the region in which the solid gloss is specified, the DFE 50 does not generate the clear-toner image data used by the low-temperature fixing device 90.

At Step S4, the clear processing 56 of the DFE 50 determines that the halftone-dot matt (M) is specified as the surface effect for pixels having the concentration values of “23” to “43” in the same page by referring to the surface-effect selection table similarly to the above. In this case, the clear processing 56 of the DFE 50 generates image data representing halftone as the clear-toner image data used by the printer 70 for the region in which the halftone-dot matt is specified. Because the low-temperature fixing device 90 does not use clear-toner image data for the region in which the halftone-dot matt is specified, the DFE 50 does not generate the clear-toner image data used by the low-temperature fixing device 90.

At Step S4, the clear processing 56 of the DFE 50 determines that the matt (PM) is specified as the surface effect for pixels having the concentration values of “1” to “17” in the same page by referring to the surface-effect selection table similarly to the above. In this case, the clear processing 56 of the DFE 50 determines that the glosser 80 is turned off in accordance with the setting of the solid gloss and the halftone-dot matt that are the other surface effects specified in the same page. The clear processing 56 does not generate the clear-toner image data used by the printer 70 for the region in which the matt is specified but generates, as the clear-toner image data used by the low-temperature fixing device 90, a solid mask for the region in which the matt is specified.

At Step S7, the si3 unit 57 of the DFE 50 integrates the clear-toner image data used by the printer 70 for the region in which the solid gloss is specified, the clear-toner image data used by the printer 70 for the region in which the halftone-dot matt is specified, the clear-toner image data used by the low-temperature fixing device 90 for the region in which the matt is specified, and the pieces of the 2-bit CMYK image data obtained by the halftone processing at Step S3. Thereafter, the si3 unit 57 outputs the integrated image data and the on-off information indicating off of the glosser 80 to the MIC 60.

The MIC 60 outputs, to the printer 70, the pieces of the CMYK image data, the clear-toner image data used by the printer 70 for the region in which the solid gloss is specified, and the clear-toner image data used by the printer 70 for the region in which the halftone-dot matt is specified to the printer 70, which are the image data output from the DFE 50. Then, the MIC 60 turns off the glosser 80 by using the on-off information output from the DFE 50. Furthermore, the MIC 60 outputs, to the low-temperature fixing device 90, the clear-toner image data used by the low-temperature fixing device 90 for the region in which the matt is specified, from among the pieces of the image data output from the DFE 50.

The printer 70 forms an image to which the CMYK toners and the clear toner are attached on the transfer sheet by using the pieces of the CMYK image data, the clear-toner image data used by the printer 70 for the region in which the solid gloss is specified, and the clear-toner image data used by the printer 70 for the region in which the halftone-dot matt is specified, which are output from the MIC 60. Because the glosser 80 is off, pressure is not applied to the transfer sheet at high temperature and high pressure.

The low-temperature fixing device 90 forms a toner image with the clear toner for the region in which the matt is specified by using the clear-toner image data that is used for the region in which the matt is specified and that is output from the MIC 60. The low-temperature fixing device 90 superimposes the toner image on the transfer sheet and fixes the toner image to the transfer sheet by applying heat and pressure at a low temperature.

Therefore, the total amount of the attached CMYK toners and the attached clear toner becomes relatively uniform in the region in which the solid gloss is specified as the surface effect. As a result, relatively intensive gloss can be obtained on the surface of the region. Furthermore, because the halftone dots are added with the clear toner, surface irregularity occurs in the region in which the halftone-dot matt is specified as the surface effect, so that the gloss on the surface of the region can be relatively suppressed. Moreover, because the clear toner is attached by the solid mask, surface irregularity occurs in the region in which the matt is specified as the surface effect, so that the gloss on the surface of the region can be suppressed.

As described above, when a plurality of different types of the surface effects are specified in the same page, and if the on or off of the glosser 80 need not be switched depending on the surface effects, it is possible to realize the different types of the surface effects in one page. However, it is difficult to realize a plurality of different types of the surface effects in one page if on or off of the glosser 80 needs to be switched depending on the surface effects in the same page.

For example, according to the embodiment in which the configuration including the printer 70, the glosser 80, and the low-temperature fixing device 90 is employed, when the specular gloss (PG) and the solid gloss (G) are specified as the surface effects in one page, the glosser 80 is turned on for the specular gloss (PM) but the glosser 80 is turned off for the solid gloss (G). Therefore, it is difficult to simultaneously realize these two types of the surface effects in one page.

As described above, when different types of the surface effects are specified in one page but it is difficult to realize the surface effects in one page, the DFE 50 according to the embodiment substitutes a surface effect other than the specified surface effect for a part of the surface effects that cannot be realized simultaneously.

Figure 19:
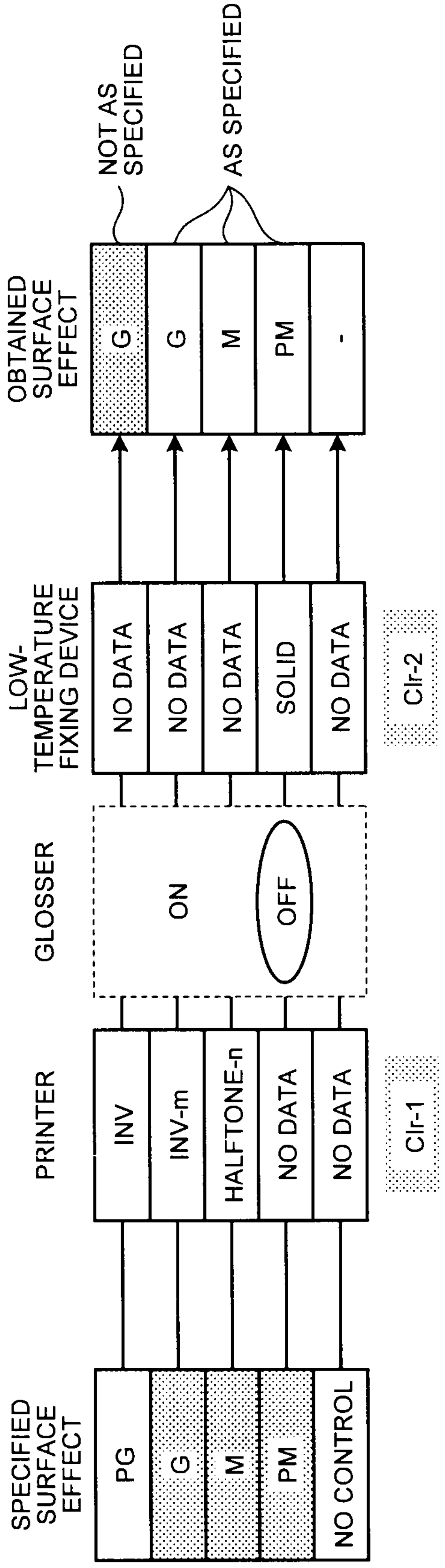
FIG. 19 is a diagram illustrating a correlation of a type of a specified surface effect, clear-toner image data used by a printer, clear-toner image data used by a low-temperature fixing device, and a surface effect that is actually obtained.

For example, as illustrated in FIG. 19, when four effects, i.e., the specular gloss (PM), the solid gloss (G), the halftone-dot matt (M), and the matt (M), have been specified in one page, the DFE 50 turns off the glosser 80, realizes the surface effects for a region in which the solid gloss is specified as the surface effect, for a region in which the halftone-dot matt is specified as the surface effect, and for a region in which the matt is specified as the surface effect in accordance with the concentration values in the gloss-control image data, and selects the solid gloss as a substitute surface effect for the specular gloss for a region in which the specular gloss is specified as the surface effect. The DFE 50 generates any of the inverse masks A, B, and C as clear-toner image data used by the printer 70 by using image data of the region in which the specular gloss is specified as the surface effect in each piece of the 8-bit CMYK image data obtained by the gamma correction, in the same manner as in the case of the solid gloss (corresponding to INV in FIG. 19). The DFE 50 does not generate clear-toner image data used by the low-temperature fixing device 90. In FIG. 15, when the concentration value is in the range of "248" to "255", the DFE 50 determines that the effect is a specular gloss type A and uses an inverse mask A. INV-m in FIG. 19 corresponds to the inverse masks 1 to 4 in FIG. 15, and halftone-n in FIG. 19 corresponds to halftone 1 to 4 in FIG. 15. As described above, on the transfer sheet that has passed through the printer 70, the glosser 80 that is off, and the low-temperature fixing device 90, the surface effect as the solid gloss is applied to the regions for which the specular gloss and the solid gloss have been specified, the surface effect as the halftone-dot matt is applied to the region in which the halftone-dot matt has been specified, and the surface effect as the matt is applied to the region in which the matt has been specified. No surface effect is applied to a region that is not specified as a region to which any surface effect is to be applied.

As described above, the DFE 50 determines the presence or absence of post processing performed by the post processing devices in accordance with the presence or absence of the post processing devices, such as the glosser 80 and the low-temperature fixing device 90, which are on the subsequent stage of the printer 70, by using the gloss-control image data in which the concentration values are set in accordance with the types of the surface effects specified by a user. Then, the DFE 50 appropriately generates clear-toner image data for attaching the clear toner. Therefore, it is possible to generate the clear-toner image data for applying the same surface effect even in any image forming systems having different configurations. Consequently, it becomes possible to apply various types of surface effects by attaching the clear toner to an image that is formed with CMYK toner images. As a result, a user can apply a desired surface effect by using the clear toner to a printed matter on which an image is formed, without taking time and effort.

According to the embodiment, the concentration value for identifying the surface effect is set to each pixel contained in the gloss-control image data. Therefore, it is possible to apply a plurality of types of surface effects in one page of a transfer sheet.

Figure 20:
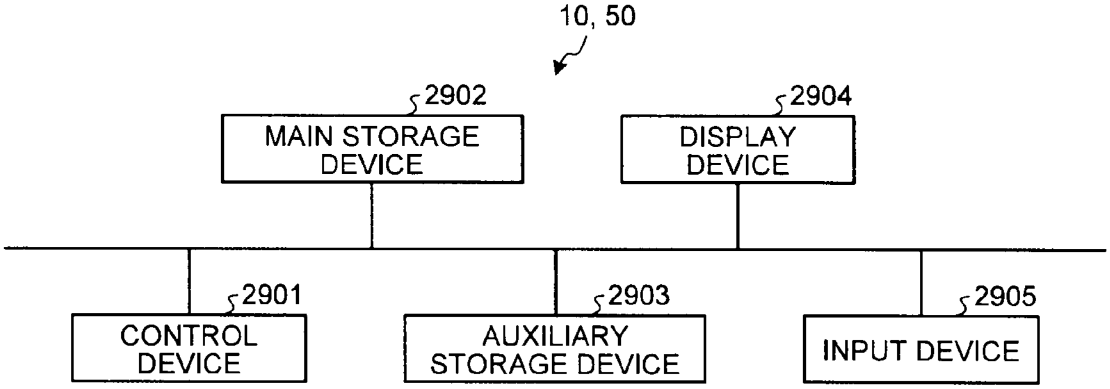
FIG. 20 is a hardware configuration diagram of the host device and the DFE.

Hardware configurations of the host device 10 and the DFE 50 according to the above embodiments will be explained below. FIG. 20 is a hardware configuration diagram of each of the host device 10 and the DFE 50. Each of the host device 10 and the DFE 50 mainly includes, as the hardware configuration, a control device 2901, such as a CPU, that controls the entire apparatus; a main storage device 2902, such as a ROM or a RAM, for storing various types of data and various types of programs; an auxiliary storage device 2903, such as an HDD, for storing various types of data and various types of programs; an input device 2905, such as a keyboard or a mouse; and a display device 2904, such as a display device. The hardware configuration is constructed by using a normal computer.

An image processing program (including the image processing application: the same is applied in the explanation given below) executed by the host device 10 of the above embodiments is stored in a computer-readable storage medium, such as a CD-ROM, a flexible disk (FD), a CD-R, or a digital versatile disk (DVD), in a computer-installable file format or a computer-executable file format, and provided as a computer program product.

The image processing program executed by the host device 10 of the above embodiments may be stored in a computer that is connected to a network, such as the Internet, and may be provided by being downloaded via the network. The image processing program executed by the host device 10 of the above embodiments may be provided or distributed via the network, such as the Internet.

The image processing program executed by the host device 10 of the above embodiments may be provided by being installed in a ROM or the like in advance.

The image processing program executed by the host device 10 of the above embodiments has a module structure including the above units, (the image processing unit, the plane-data generating unit, the print-data generating unit, the input control unit, and the display control unit). As actual hardware, a CPU (processor) reads and executes the image processing program from the storage medium to load the above units to the main storage device, so that the image processing unit, the plane-data generating unit, the print-data generating unit, the input control unit, and the display control unit are generated on the main storage device.

A print control process executed by the DFE 50 of the above embodiments may be realized by a print control program as software instead of hardware. In this case, the print control program executed by the DFE 50 of the above embodiments is provided by being installed in a ROM or the like in advance.

The print control program executed by the DFE 50 of the above embodiments may be recorded in a computer-readable recording medium, such as a CD-ROM, a flexible disk (FD), a CD-R, or a digital versatile disk (DVD), in a computer-installable file format or a computer-executable file format, and provided as a computer program product.

The print control program executed by the DFE 50 of the above embodiments may be stored in a computer that is connected to a network, such as the Internet, and may be provided by being downloaded via the network. The print control program executed by the DFE 50 of the above embodiments may be provided or distributed via the network, such as the Internet.

The print control program executed by the DFE 50 of the embodiment has a module structure including the above units (the rendering engine, the halftone engine, the TRC, the si1 unit, the si2 unit, the si3 unit, and the clear processing). As actual hardware, a CPU (processor) reads and executes the print control program from the ROM to load the above units on the main storage device, so that the rendering engine, the halftone engine, the TRC, the si1 unit, the si2 unit, the si3 unit, and the clear processing are generated on the main storage device.

In the embodiments described above, the image forming system is configured to include the host device 10, the DFE 50, the MIC 60, the printer 70, the glosser 80, and the low-temperature fixing device 90; however, the configuration is not limited thereto. For example, it is possible to construct one image forming device by integrating the DFE 50, the MIC 60, and the printer 70, or it is possible to construct an image forming apparatus that includes the DFE 50, the MIC 60, the printer 70, the glosser 80, and the low-temperature fixing device 90.

In the image forming systems according to the above embodiments, toners of a plurality of colors, i.e., CMYK toner, are used for forming an image. However, it is possible to form an image by using a toner of a single color.

According to one aspect of the present invention, it is possible to apply a desired surface effect with a clear toner to a printed matter on which an image is formed, without taking time and effort.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing apparatus connected to a print control apparatus that controls a printing device, wherein the printing device forms an image to which a surface effect that is a visual or tactile effect is applied by attaching clear toner to a recording medium, the information processing apparatus comprising:

an input unit that receives specifications both of a plurality of types of surface effects to be applied to the recording medium, and regions to which the surface effects are respectively applied, with respect to input image data for one page of the recording medium;

a storing unit that stores therein the types of surface effects and values respectively corresponding to the types of surface effects;

a generating unit that generates, based on the types of surface effects received by the input unit, values respectively corresponding to the types of surface effects thus received by referring to the storing unit; and a sending unit that sends both of the regions to which the types of surface effects are respectively applied and the values respectively corresponding to the types of surface effects generated by the generating unit to the print control apparatus, wherein the values stored in the storing unit include a value determinative of whether a plurality of types of surface effects can be applied to one page of the recording medium, and wherein the sending unit sends both of the regions to which the types of surface effects are respectively applied and the values respectively corresponding to the types of surface effects generated by the generating unit to the print control apparatus only when the value determinative of whether a plurality of types of surface effects can be applied to one page of the recording medium corresponds to a value indicating that a plurality of types of surface effects can be applied to one page of the recording medium.

2. The information processing apparatus according to claim 1, wherein the generating unit generates the data for each drawing object contained in the image data.

3. The information processing apparatus according to claim 1, wherein the input unit receives specifications of a transparent image other than the surface effect and a region to which the transparent image is applied, with respect to the image data, the generating unit generates clear data for identifying the transparent image and the region to which the transparent image is applied in the recording medium, based on the specifications, and the sending unit sends the clear data to the print control apparatus.

4. The information processing apparatus according to claim 1, wherein the sending unit integrally sends the data in a predetermined data format.

5. An information processing apparatus connected to a print control apparatus that controls a printing device, wherein the printing device forms an image on a recording medium, to which a surface effect that is a visual or tactile effect is applied, based on at least one piece of clear toner data used for attaching clear toner, the information processing apparatus comprising:

an input unit that receives specifications both of a plurality of types of a surface effects to be applied to the recording medium, and regions to which the surface effects are respectively applied, with respect to input image data for one page of the recording medium;

a storing unit that stores therein the types of surface effects and values respectively corresponding to the types of surface effects;

a generating unit that generates, based on the types of surface effects received by the input unit, values respectively corresponding to the types of surface effects thus received by referring to the storing unit; and a sending unit that sends both of the regions to which the types of surface effects are respectively applied and the values respectively corresponding to the types of surface effects generated by the generating unit to the print control apparatus, wherein the type of the surface effect includes a gloss applying effect that applies gloss and a gloss suppressing effect that suppresses gloss, and the generating unit generates the data in which a gloss control value equal to or greater than a first predetermined concentration value is associated with the gloss applying effect and a gloss control value smaller than a second predetermined concentration value is associated with the gloss suppressing effect, wherein the values stored in the storing unit include a value determinative of whether a plurality of types of surface effects can be applied to one page of the recording medium, and wherein the sending unit sends both of the regions to which the types of surface effects are respectively applied and the values respectively corresponding to the types of surface effects generated by the generating unit to the print control apparatus only when the value determinative of whether a plurality of types of surface effects can be applied to one page of the recording medium corresponds to a value indicating that a plurality of types of surface effects can be applied to one page of the recording medium.

6. An information processing apparatus connected to a print control apparatus that controls a printing device, wherein the printing device forms an image on a recording medium, to which a surface effect that is a visual or tactile effect is applied, based on at least one piece of clear toner data used for attaching clear toner, the information processing apparatus comprising:

an input unit that receives specifications both of a plurality of types of a surface effects to be applied to the recording medium, and regions to which the surface effects are respectively applied, with respect to input image data for one page of the recording medium;

a storing unit that stores therein the types of surface effects and values respectively corresponding to the types of surface effects;

a generating unit that generates, based on the types of surface effects received by the input unit, values respectively corresponding to the types of surface effects thus received by referring to the storing unit; and a sending unit that sends both of the regions to which the types of surface effects are respectively applied and the values respectively corresponding to the types of surface effects generated by the generating unit to the print control apparatus, wherein the type of the surface effect includes a gloss applying effect that applies gloss and a gloss suppressing effect that suppresses gloss, and the generating unit generates the data in which a gloss control value equal to or greater than a first predetermined concentration value is associated with the gloss applying effect and a gloss control value smaller than a second predetermined concentration value is associated with the gloss suppressing effect, wherein the generating unit generates the data containing specular gloss and solid gloss as the gloss applying effect and containing halftone-dot matt and matt as the gloss suppressing effect.

7. An information processing apparatus connected to a print control apparatus that controls a printing device, wherein the printing device forms an image to which a surface effect that is a visual or tactile effect is applied by attaching clear toner to a recording medium, the information processing apparatus comprising:

an input unit that receives specifications both of a plurality of types of surface effects to be applied to the recording medium, and regions to which the surface effects are respectively applied, with respect to input image data for one page of the recording medium;

a storing unit that stores therein the types of surface effects and values respectively corresponding to the types of surface effects;

a generating unit that generates, based on the types of surface effects received by the input unit, values respectively corresponding to the types of surface effects thus received by referring to the storing unit; and a sending unit that sends both of the regions to which the types of surface effects are respectively applied and the values respectively corresponding to the types of surface effects generated by the generating unit to the print control apparatus, wherein the generating unit generates the data in which types of surface effects are associated with regions in the recording medium for every 2% change in a concentration ratio calculated from the gloss control value.

8. A data generation method implemented by an information processing apparatus connected to a print control apparatus that controls a printing device, wherein the printing device forms an image to which a surface effect that is a visual or tactile effect is applied by attaching clear toner to a recording medium, the data generation method comprising:

receiving specifications both of a plurality of types of surface effects to be applied to the recording medium, and regions to which the surface effects are respectively applied, with respect to input image data for one page of the recording medium;

storing types of surface effects and values respectively corresponding to the types of surface effects;

generating, based on the types of received surface effects, values respectively corresponding to the types of surface effects by referring to the stored types of surface effects and values; and sending both of the regions to which the types of surface effects are respectively applied and the generated values respectively corresponding to the types of surface effects to the print control apparatus, wherein the stored values include a value determinative of whether a plurality of types of surface effects can be applied to one page of the recording medium, and wherein both of the regions to which the types of surface effects are respectively applied and the values respectively corresponding to the types of surface effects are sent to the print control apparatus only when the value determinative of whether a plurality of types of surface effects can be applied to one page of the recording medium corresponds to a value indicating that a plurality of types of surface effects can be applied to one page of the recording medium.

* * * * *